(12) United States Patent
Shiga et al.

(10) Patent No.: US 8,161,487 B2
(45) Date of Patent: Apr. 17, 2012

(54) CONTROLLER FOR CONTROLLING A PLURALITY OF LOGICAL RESOURCES OF A STORAGE SYSTEM

(75) Inventors: Kenta Shiga, Yokohama (JP); Toshihiko Murakami, Fujisawa (JP); Daiki Nakatsuka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1105 days.

(21) Appl. No.: 11/971,927

(22) Filed: Jan. 10, 2008

(65) Prior Publication Data

US 2008/0183965 A1 Jul. 31, 2008

(30) Foreign Application Priority Data

Jan. 29, 2007 (JP) ................................ 2007-017665

(51) Int. Cl.
G06F 9/46 (2006.01)
(52) U.S. Cl. ....................................... 718/104; 711/165
(58) Field of Classification Search .................. 718/104; 711/165
See application file for complete search history.

(56) References Cited

U.S. PATENT DOCUMENTS

| | | | |
|---|---|---|---|
| 7,325,097 B1 * | 1/2008 | Darcy ............................ | 711/117 |
| 7,412,583 B2 * | 8/2008 | Burton et al. .................. | 711/170 |
| 2004/0098537 A1 * | 5/2004 | Serizawa ....................... | 711/112 |
| 2005/0091455 A1 | 4/2005 | Kano et al. | |
| 2005/0235132 A1 * | 10/2005 | Karr et al. ..................... | 711/203 |
| 2005/0278465 A1 * | 12/2005 | Qi .................................. | 710/36 |
| 2006/0242363 A1 | 10/2006 | Tamura et al. | |
| 2007/0033367 A1 * | 2/2007 | Sakarda et al. ............... | 711/170 |
| 2007/0079100 A1 * | 4/2007 | Shiga et al. ................... | 711/170 |
| 2009/0125694 A1 * | 5/2009 | Innan et al. ................... | 711/170 |

FOREIGN PATENT DOCUMENTS

| | | |
|---|---|---|
| JP | 2003-15915 | 1/2003 |
| JP | 2005-107645 | 4/2005 |

OTHER PUBLICATIONS

European Search Report dated Sep. 29, 2011 for Application No. EP 08 25 0023.
Haeusser et al.: "IBM TotalStorage Peer-to-Peer Virtual Tape Server Planning and Implementation Guide", SG24-6115-03. Jun. 2006. pp. I-XXVI, 7-62, 321-362, XP000002658909. ISBN 0738497088 Retrieved from the Internet: http://www.redbooks.ibm.com/redbooks/pdfs/sg246115.pdf—retrieved on Sep. 14, 2011.

* cited by examiner

*Primary Examiner* — Chun Cao
*Assistant Examiner* — Xuxing Chen
(74) *Attorney, Agent, or Firm* — Antonelli, Terry, Stout & Kraus, LLP.

(57) ABSTRACT

A controller for controlling a logical resource of a storage system comprises a virtual resource preparation section for preparing a virtual resource which is a virtual logical resource, and a real resource assignment section that assigns a real resource which is a logical resource of a real entity to the prepared virtual resource. One or more backup resources which are virtual resources that have not yet been used by a higher-level section that is on a higher level than the controller are prepared by the virtual resource preparation section for one or more of the higher-level section.

18 Claims, 22 Drawing Sheets

FIG. 2A

HOST TABLE 121

| HOST ID (1211) | VIRTUAL LUN (1212) | REAL LU (1213) |
|---|---|---|
| H01 | 0 | 0 |
| H01 | 1 | UNASSIGNED |
| H02 | 0 | 1 |
| H02 | 1 | 2 |
| H02 | 2 | UNASSIGNED |
| . . . | . . . | . . . |

FIG. 2B

LU TABLE 122

| REAL LUN (1221) | STATUS (1222) |
|---|---|
| 0 | ASSIGNED |
| 1 | ASSIGNED |
| 2 | ASSIGNED |
| 3 | UNASSIGNED |
| . . . | . . . |

PRIOR TO INITIAL WRITE TO VIRTUAL LU1 (PRIOR TO RE-LOGIN)

AFTER INITIAL WRITE TO VIRTUAL LU1 (AFTER RE-LOGIN)

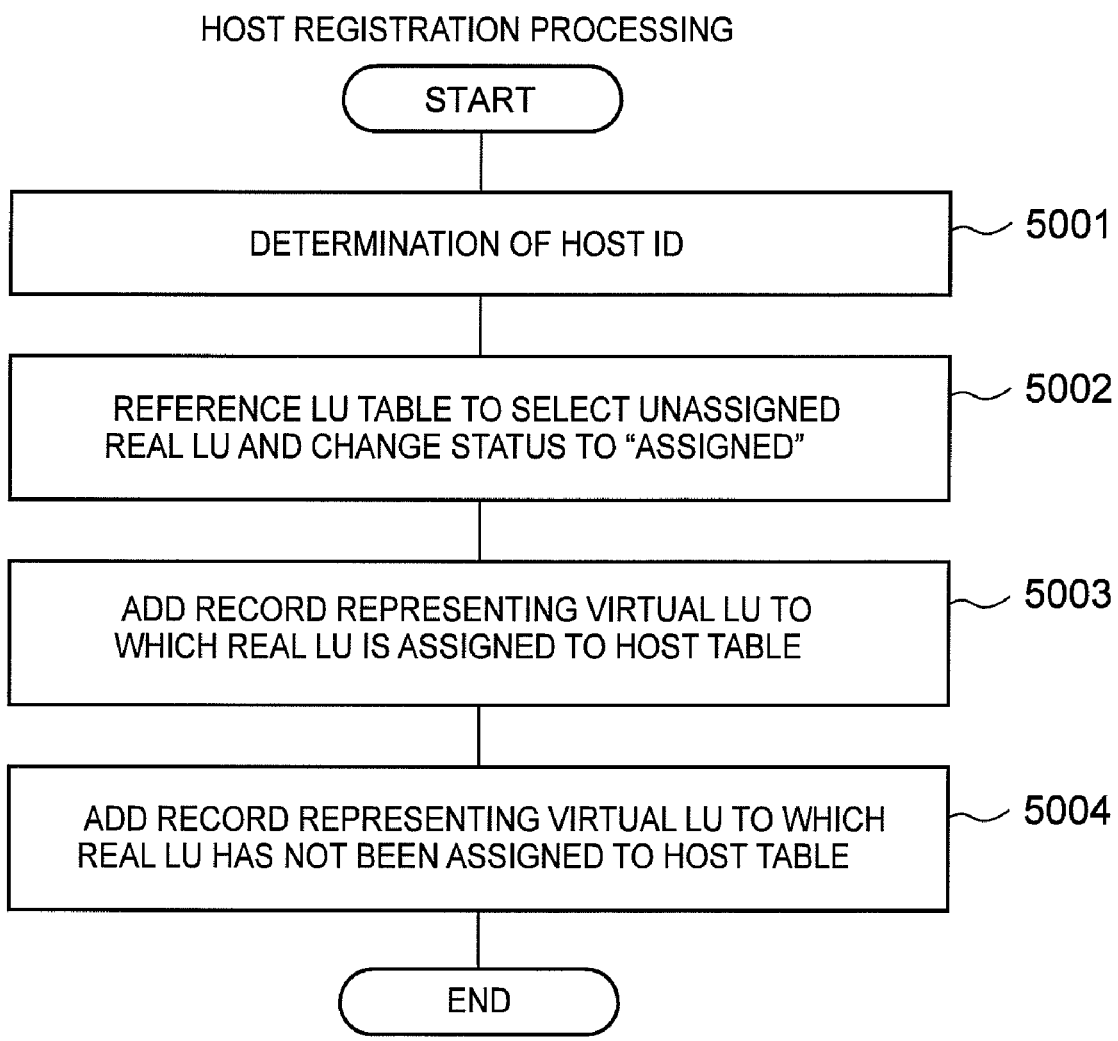

REAL LU ASSIGNMENT PROCESSING

SESSION CLOSE PROCESSING

FIG. 10A

HOST TABLE 123

| HOST ID (1231) | VIRTUAL PATH (1232) | REAL PATH (1233) |
|---|---|---|
| H01 | 0 | 0 |
| H01 | 1 | UNASSIGNED |
| . . . | . . . | . . . |

FIG. 10B

PATH TABLE 124

| REAL PATH (1241) | PORT ID (1242) | LUN (1243) | STATUS (1244) |
|---|---|---|---|
| 0 | P00 | 0 | ASSIGNED |
| 1 | P01 | 0 | UNASSIGNED |
| 2 | P02 | 0 | UNASSIGNED |
| 3 | P03 | 0 | UNASSIGNED |
| . . . | . . . | . . . | . . . |

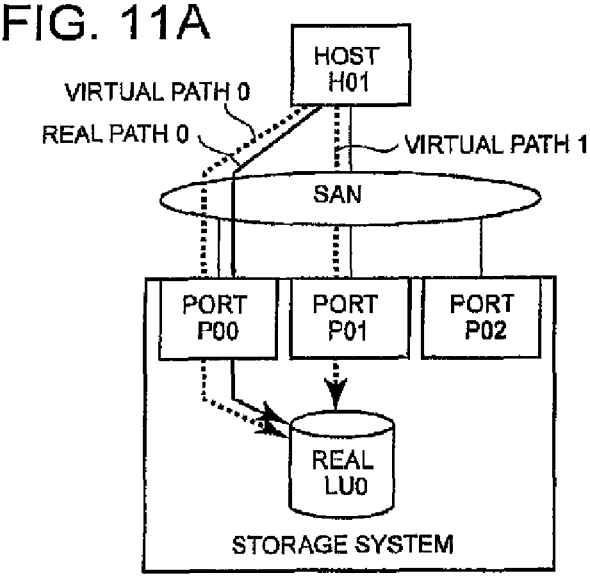
FIG. 11A
FIG. 11B
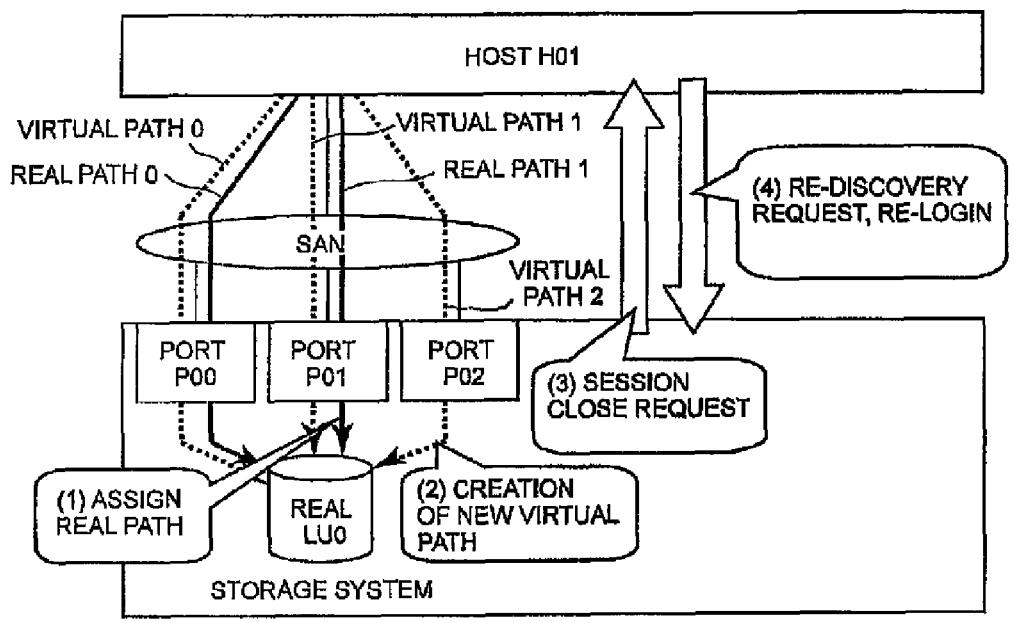

PRIOR TO INITIAL I/O USING VIRTUAL PATH 1 (PRIOR TO RE-LOGIN)

AFTER INITIAL I/O USING VIRTUAL PATH 1 (AFTER RE-LOGIN)

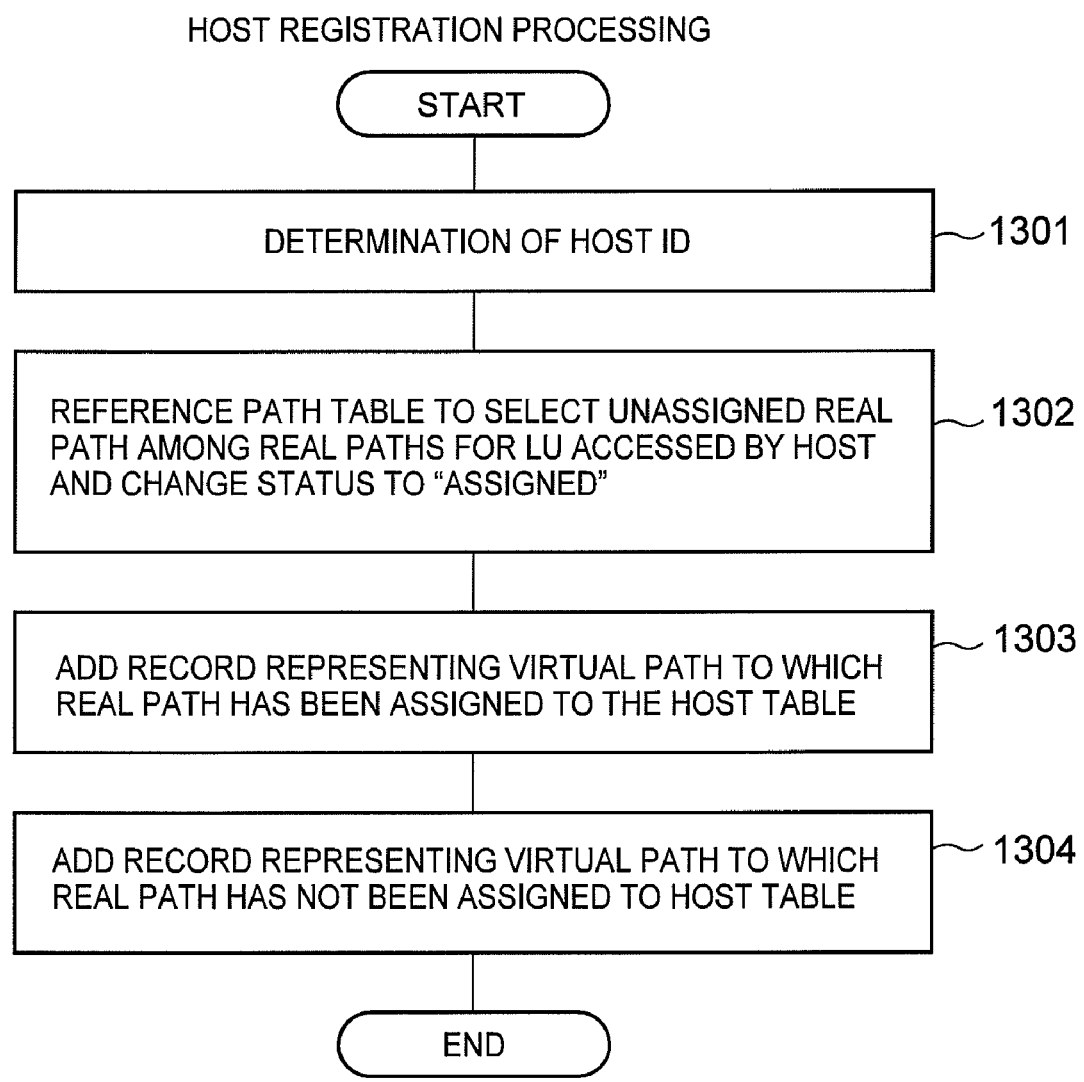

FIG. 20A

HOST TABLE 121

| HOST ID (1211) | VIRTUAL LUN (1212) | REAL LUN (1213) |
|---|---|---|
| H01 | 0 | 0 |
| H02 | 0 | 1 |
| H02 | 1 | 2 |
| H02 | 2 | UNASSIGNED |
| . . . | . . . | . . . |

FIG. 20B

LU TABLE 122

| REAL LUN (1221) | STATUS (1222) |
|---|---|
| 0 | UNASSIGNED |
| 1 | ASSIGNDE |
| 2 | ASSIGNDE |
| 3 | UNASSIGNED |
| . . . | . . . |

HOST TABLE 121

| HOST ID | VIRTUAL LUN | REAL LUN |
|---|---|---|
| H01 | 0 | 0 |
| H01 | 1 | 3 |
| H01 | 2 | UNASSIGNED |
| H02 | 0 | 1 |
| H02 | 1 | 2 |
| H02 | 2 | UNASSIGNED |
| . . . | . . . | . . . |

LU TABLE 122

| REAL LUN | STATUS |
|---|---|
| 0 | ASSIGNED |
| 1 | ASSIGNED |
| 2 | ASSIGNED |
| 3 | ASSIGNED |
| . . . | . . . |

# CONTROLLER FOR CONTROLLING A PLURALITY OF LOGICAL RESOURCES OF A STORAGE SYSTEM

CROSS-REFERENCE TO PRIOR APPLICATION

This application relates to and claims the benefit of priority from Japanese Patent Application number 2007-17665, filed on Jan. 29, 2007 the entire disclosure of which is incorporated herein by reference.

BACKGROUND

The present invention relates to controlling a plurality of logical resources of a storage system.

Storage systems include logical resources of a plurality of types and one of these logical resources of a plurality of types is an LU (Logical Unit) which is a logical storage device, for example. LU types include real LUs and virtual LUs, for example. Real LUs are LUs in which at least one storage space is prepared as a base among a plurality of physical storage devices provided in the storage system. A virtual LU is a virtual LU that is provided in a higher-level section of the storage system (host computer, for example). All or some of the real LUs are assigned to virtual LUs. When the storage system receives an I/O command (write command/read command) to designate a virtual LU from a higher-level section, data I/O can be executed with respect to the real LUs or some of the real LU that have been assigned to a virtual LU. As a virtual LU, an LU that has been provided by a Thin Provisioning technology, for example, in other words, an LU for which the storage capacity has been automatically expanded can be adopted. The technology related to Thin Provisioning is disclosed in Japanese Application Laid Open No. 2003-15915, for example.

Generally, so that logical resources of respective predetermined types of the storage system can be utilized in the higher-level section, the configuration of information related to the logical resources of the respective predetermined types (called 'logical resource information configuration' hereinbelow) must be performed manually by the administrator with respect to storage controllers for controlling the usage of logical resources. When logical resources of the predetermined types are LU, the administrator must manually input at least one of the number of LUs, the size of the LUs, which LU is assigned to which host, for example, for the configuration of LU logical resource information.

Storage system are generally installed and used in a variety of enterprises or government administration offices. In order to configure logical resource information, technical knowledge related to the storage systems is often required. For this reason, at the installation destination, the person with such knowledge is the administrator who configures the logical resource information. If the need to configure logical resource information can be eliminated as far as possible, the storage system may be considered as being easy to install and use. Depending on the installation destination of the storage system, when a person with specialized knowledge relating to the storage system is not present, that is, when a person who is able to act as administrator is not present, it may be considered desirable to eliminate the need to configure the logical resource information in such an installation destination in particular.

SUMMARY

Therefore, an object of the present invention is to obviate the need to configure logical resource information to enable logical resources of predetermined types of the storage system to be utilized in the higher-level section.

Further objects of the present invention will become evident from the following description.

A controller for controlling the logical resource of the storage system comprises a virtual resource preparation section for preparing a virtual resource which is a virtual logical resource and a real resource assignment section that assigns a real resource which is a logical resource of a real entity to the prepared virtual resource. One or more backup resources which are virtual resources that have not yet been used by a higher-level section that is on a higher level than the controller are prepared by the virtual resource preparation section for one or more of the higher-level section.

BRIEF DESCRIPTION OF THE DRAWINGS

FIG. 2A is a constitutional example of a host table of the first embodiment of the present invention and shows the host table in FIG. 3B;

FIG. 2B is a constitutional example of an LU table of the first embodiment of the present invention and shows the LU table in FIG. 3B;

FIG. 5 shows an example of the flow of host registration processing that is executed by a CPU according to a host registration program of the first embodiment of the present invention;

FIG. 10A shows a constitutional example of a host table according to the second embodiment of the present invention;

FIG. 10B shows a constitutional example of a path table according to the second embodiment of the present invention;

FIG. 11A shows an example of the state during host installation of the second embodiment of the present invention;

FIG. 11B is an explanatory diagram of an example of the processing that is executed in cases where a virtual path 1 is used for the first time in FIG. 11A;

FIG. 13 shows an example of the flow of host registration processing that is executed by a CPU according to the host registration program of the second embodiment of the present invention;

FIG. 20A shows the host table in FIG. 3A;

FIG. 20B shows the LU table in FIG. 3A;

DETAILED DESCRIPTION OF THE PREFERRED EMBODIMENTS

Figure 1:
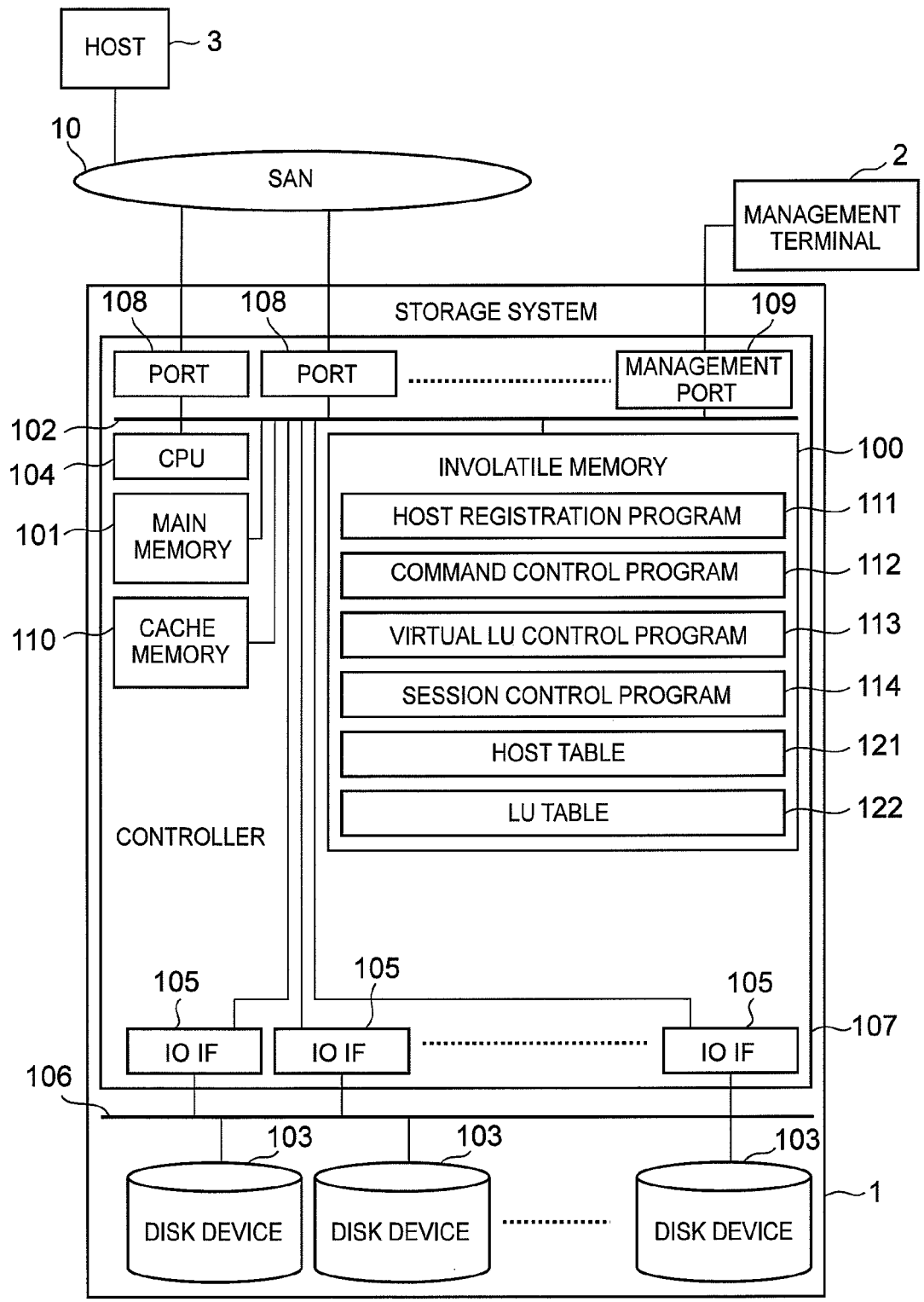
FIG. 1 shows a constitutional example of the computer system according to a first embodiment of the present invention.

An overview of the first embodiment will now be described.

The controller for controlling the logical resources of the storage system comprises a virtual resource preparation section that prepares virtual resource which are virtual logical resources and a real resource assignment section that assigns real resources which are logical resources of real entities to the prepared virtual resources. As a result of the virtual resource preparation section, one or more backup resources which are virtual resources that have not been used by the higher-level section which is superior to the controller are prepared for one or more of the respective higher-level sections.

The controller may be installed in the storage system or may exist outside the storage system (may be a switch device which is connected to the storage system, for example). A storage system can be constructed by means of the controller and a plurality of physical storage devices that are connected to the controller.

A host computer, a computer program (or application program, for example) that is executed by the host computer or the work that can be defined by using one or more host computers and/or one or more computer programs and so forth are possible as various units of the higher-level section.

In one embodiment, the virtual resource preparation section is able to prepare new backup resources for the higher-level section given that the backup resources prepared for the higher-level section are being used for the first time by the higher-level section. In addition, the backup resources can be made the virtual resources to which real resources have not been assigned. In this case, the real resource assignment section is able to select real resources that have not been assigned to any virtual resources from a plurality of real resources given that backup resources are being used for the first time by the higher-level section and is able to assign the selected real resources to the backup resources used for the first time.

In one embodiment, a close request section that issues a request to the higher-level section to close the connection with the higher-level section given that new backup resources have been prepared in the higher-level section may be further provided.

In one embodiment, the virtual resources can be a virtual storage device which is a virtual logical storage device (LU, for example). The real resources can be a real storage device which is a logical storage device of an entity which is formed based on one or more physical storage devices among a plurality of physical storage devices provided for the storage system. The backup resources can be backup storage devices which are virtual logical storage device that have not yet been designated by a write command that is transmitted by the higher-level section.

The virtual resource preparation section can prepare a new backup storage device for the higher-level section given that the virtual resource preparation section has received a write command designating a backup storage device from the higher-level section for the first time. The backup storage device may be a virtual storage device to which a real storage device has not been assigned. In this case, given that a write command designating a backup storage device is received from the higher-level section for the first time, the real resource assignment section is able to select a real storage device that has not been assigned to any virtual storage device from among a plurality of real storage devices and is able to assign the selected real storage device to the backup storage device.

The controller may comprise a command control section that writes write target data according to a received write command to the real storage device that has been assigned to the backup storage device designated by the write command and a close request section that transmits a close request which is a request to close the connection with the higher-level section to the higher-level section given that a new backup storage device has been prepared for the higher-level section. In this case, the command control section is able to re-connect the higher-level section and the controller after the connection has been closed in response to the close request and is able to provide the higher-level section with information (virtual LUN, for example) relating to the new backup storage device prepared for the higher-level section in response to a command of a predetermined type received from the higher-level section.

The controller may further comprise a storage region for storing policy information defining how many virtual storage devices and/or which capacities of virtual storage devices are prepared for the higher-level section of a particular type. In this case, the virtual resource preparation section is able to control the number and/or capacity of the backup storage devices stored for the higher-level section on the basis of the type of higher-level section of the transmission source of the write command and the policy information.

In one embodiment, a virtual resource can be a virtual path which is virtual logical path. A real resource can be a real path which is a logical path for an entity. The backup resource can be a backup path which is a virtual path which has not yet been used in the transmission of the I/O command transmitted by the higher-level section.

The virtual resource preparation section is able to prepare a new backup path for the higher-level section given that an I/O command that has passed via the backup path is received for the first time from the higher-level section. The backup path may be a virtual path to which a real path has not been assigned. In this case, the real resource assignment section is able to select a real path that has not been assigned to any virtual path from among a plurality of real paths given that an I/O command that has passed via the backup path is received for the first time from the higher-level section and is able to assign the selected real path to the backup path. Further, the fact that an I/O command has passed through a backup path for the first time can be detected from the fact that a real path has not been assigned to the backup path, for example.

The controller may further comprise a command control section for processing a received I/O command and a close request section that transmits a close request which is a request to close the connection with the higher-level section to the higher-level section given that a new backup path has been prepared for the higher-level section. The command control section is able to re-connect the higher-level section and controller after the connection has been closed in response to the close request and is able to provide the higher-level section with information (the port ID, for example) relating to a new backup path that is prepared for the higher-level section in response to a command of a predetermined type received from the higher-level section.

The controller may further comprise a plurality of ports that receive commands transmitted from each of the one or more higher-level sections and the logical path may contain the port ID. In this case, in response to the load of the respective ports corresponding with the port IDs of two or more real paths that have not been assigned to any virtual paths, the real resource assignment section is able to control a real path selected from among the two or more real paths.

In one embodiment, the virtual resources may be both virtual storage devices and virtual paths. Likewise, real resources may be both real storage devices and real paths and backup resources may be both backup storage devices and backup paths.

Each of the above sections can be constructed by hardware, computer programs or a combination thereof (some of the above sections are implemented by computer programs while the remainder is implemented by hardware, for example). A computer program is read to a predetermined processor and executed thereby. Further, during the information processing that is executed when a computer program is read to a processor, a storage area that exists in a hardware resource such as memory may suitably be used. Further, the computer program may be installed on a computer from a recording medium such as a CD-ROM or may be downloaded to a computer via a communication network.

A few embodiments of the present invention will be described in detail hereinbelow with reference to the drawings. Thereupon, as logical resources of predetermined types, an embodiment for which an LU is adopted by way of example is 'the first embodiment' and an embodiment for which a logical path is adopted by way of example is the 'second embodiment'.

First Embodiment

FIG. 1 shows a constitutional example of the computer system according to the first embodiment of the present invention.

A host computer 3 and storage system 1 are connected to a SAN (Storage Area Network) 10. In place of the SAN 10, another network such as the Internet or a LAN (Local Area Network), for example, may be adopted. In other words, the communication protocol between the host computer 3 and the storage system 1, for example, may be Fiber Channel, TCP (Transmission Control Protocol)/IP (Internet Protocol) or iSCSI (internet Small Computer System Interface). Further, FIG. 1 shows one host computer 3 but, in reality, a plurality thereof exist. The number of host computers 3 may also be one.

Figure 22:
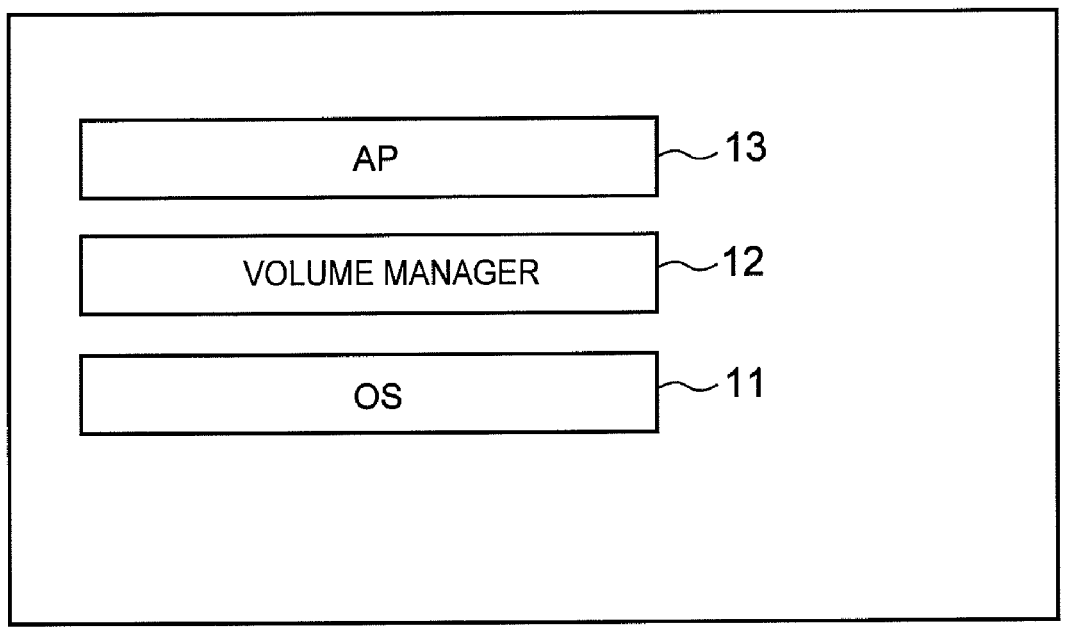
FIG. 22 shows an example of a plurality of computer programs that are provided for the host in the first embodiment of the present invention.

The host computer 3 comprises a CPU and a storage resource. As shown in FIG. 22, the storage resource stores an OS (Operating System) 11, a volume manager 12, and an application program ('AP' hereinbelow) 13, which are executed by a CPU. In cases where the computer program is the subject hereinbelow, in reality, the processing is executed by a CPU that executes the computer program. The volume manager 12 is able to identify (mount, for example) and manage the virtual LU with which the host computer 3 is provided. The AP13 is able to transmit I/O commands (write command/read command) via the volume manager 12 and OS 11.

The storage system 1 comprises a controller 107 and a plurality of disk devices 103.

Each of the plurality of disk devices 103 is a physical disk-type storage device and, more specifically, for example, a hard disk drive. Naturally, a physical disk-type storage device of another type such as a DVD (Digital Versatile Disk) drive may also be adopted in place of a hard disk drive or another type of storage device such as a flash memory device may also be adopted. Based on the storage space of the plurality of disk devices 103, a plurality of real LUs are formed. The respective real LUs may be formed based on the storage space of the RAID group afforded a RAID constitution by two or more disk devices 103 among a plurality of disk devices 103, for example.

The controller 107 is a device for controlling the operation of the storage system 1. The controller 107 comprises one or more ports 108, a management port 109, a main memory 101, a cache memory 110, an involatile memory 100, one or more IO I/F 105, and a path 102 connecting the foregoing parts. In place of the path 102, a transfer controller of another type (a switch constituted by an LSI (Large Scale Integration) circuit, for example) may be adopted.

Each of the one or more IO I/F 105 is an interface device for communicating with each of the plurality of disk devices 103 (affording data I/O, for example). The respective IO I/F 105 and respective disk devices 103 are connected to the path 106.

Each of one or more ports 108 are ports connected to the SAN 10 and receive I/O commands from the host computer 3 via the SAN 10, for example.

The management port 109 is a port for communicating with the management terminal 2. Communications are performed via a communication network or dedicated line between the management port 109 and management terminal 2.

The main memory 101 is a volatile (or involatile) memory, for example and is used as a working area for the CPU 104, for example.

The cache memory 110 temporarily stores write target data that is written to a virtual LU in accordance with a write command received from the host computer 3 and read target data that is read from the virtual LU in accordance with a read command received from the host computer 3. Further, in this embodiment, 'write target data are written to a virtual LU in accordance with a write command' signifies the fact that write target data are written to a physical region corresponding with the virtual region specified by the write command. The 'physical region corresponding with the virtual region' is a physical region that corresponds to a real region corresponding with the virtual region. Virtual region signifies a storage region in the virtual LU (the region corresponding with the address specified by the I/O command, for example), real region signifies a storage region in a real LU, and physical region signifies a storage region in the disk device 103. 'Read target data are read in accordance with a read command' signifies the fact that read target data are read from a physical region that corresponds with the virtual region specified by the read command.

The involatile memory 100 stores a plurality of computer programs that are executed by the CPU 104 and information referenced by the CPU 104. The plurality of computer programs include, for example, a host registration program 111 that executes host registration processing, a command control program 112 that executes command control processing, a virtual LU control program 113 that executes real LU assignment processing, and a session control program 114 that executes session close processing. Information referenced by the CPU 104 includes a host table 121 and LU table 122, for example.

FIG. 2A shows a constitutional view of the host table 121.

The host table 121 has a column 1211 in which the host ID is written, a column 1212 in which the virtual LUN is written, and a column 1213 in which a real LUN is written. In each record constituting the host table 121, a host ID is written to a field crossing column 1211, a virtual LUN is written to a field crossing column 1212, and a real LUN is written to a field crossing column 1213. A host ID is an identifier of the host computer 3. A virtual LUN is the LUN (Logical Unit Number) of a virtual LU. A real LUN is the LUN of a real LU. Values for a real LUN include the value "unassigned". This signifies that a real LU has not been assigned to a virtual LU (a virtual LU corresponding with a virtual LUN1, for example).

In the description of this embodiment, a 'record' signifies a row of the table. Hence, according to the first record, for example, a virtual LU corresponding to the virtual LUN "0" ('virtual LU0' hereinbelow) is visible to the host corresponding with the host ID "H01" ('host H01' hereinbelow). It can be seen that a real LU that corresponds to the real LUN "0" (real LU0 hereinbelow) has been assigned to the virtual LU0. Furthermore, it is clear from the second record that a virtual LU1 is visible to the host H01 but that a real LU has not been assigned.

In the description of this embodiment, in order to simplify the description, the number of real LU assigned to one virtual LU is one. That is, the virtual LUs and real LUs correspond with one another one-for-one. Further, according to FIG. 2A, although the same virtual LU0 and LU1 are provided for different hosts H01 and H02, the virtual LU0 and LU1 with which the host H01 is provided and the virtual LU0 and LU1 with which the host H02 is provided are different. In other words, the identification of a virtual LU is carried out by means of a combination of a virtual LUN and host ID and, as a result, a plurality of virtual LUs with the same virtual LUN are not provided for one host.

FIG. 2B shows a constitutional view of the LU table 122.

The LU table 122 has a column 1221 in which a real LUN is written and a column 1222 to which the status relating to the real LU is written. In the respective records constituting the LU table 122, a real LUN is written in a field crossing column 1221 and the status pertaining to the real LU is written in a field crossing the column 1222. Although there are two types of status pertaining to the real LU, namely, assigned and unassigned, for example, there may also be a larger number of status types.

Incidentally, in this embodiment, a plurality of real LU are pre-prepared at the time of installation of the storage system 1 (in other words, when the storage system 1 is shipped). The number of real LU and the size of the real LU and so forth need not to be changed by the administrator (operator of management terminal 2). At the time the storage system 1 is installed, of the host table 121 and LU table 122, at least the LU table 122 may be prepared. Further, the real LUN of all the pre-prepared real LU are recorded in all the fields of the column 1221 of the LU table 122 and 'unassigned' may be recorded in all the fields in column 1222.

The computer system of this embodiment was described hereinabove.

According to this embodiment, one or more virtual LU to which a real LU has not been assigned are always prepared as backup resources. In other words, one or more virtual LU are always visible to the host. Although it is not clear to the host which of the one or more virtual LU have a real LU assigned thereto and which do not have a real LU assigned thereto, there exists at least one of the one or more virtual LU to which a real LU has not been assigned. An overview of an example of the flow of processing that is carried out in this embodiment will be described hereinbelow with reference to FIGS. 3A, 3B, and 3C. In each of FIGS. 3A, 3B, and 3C, a virtual LU is indicated by a dotted line and a real LU assigned to the virtual LU is indicated by a bold line. An illustration of real LU that have not been assigned to a virtual LU is omitted.

Figure 3B:
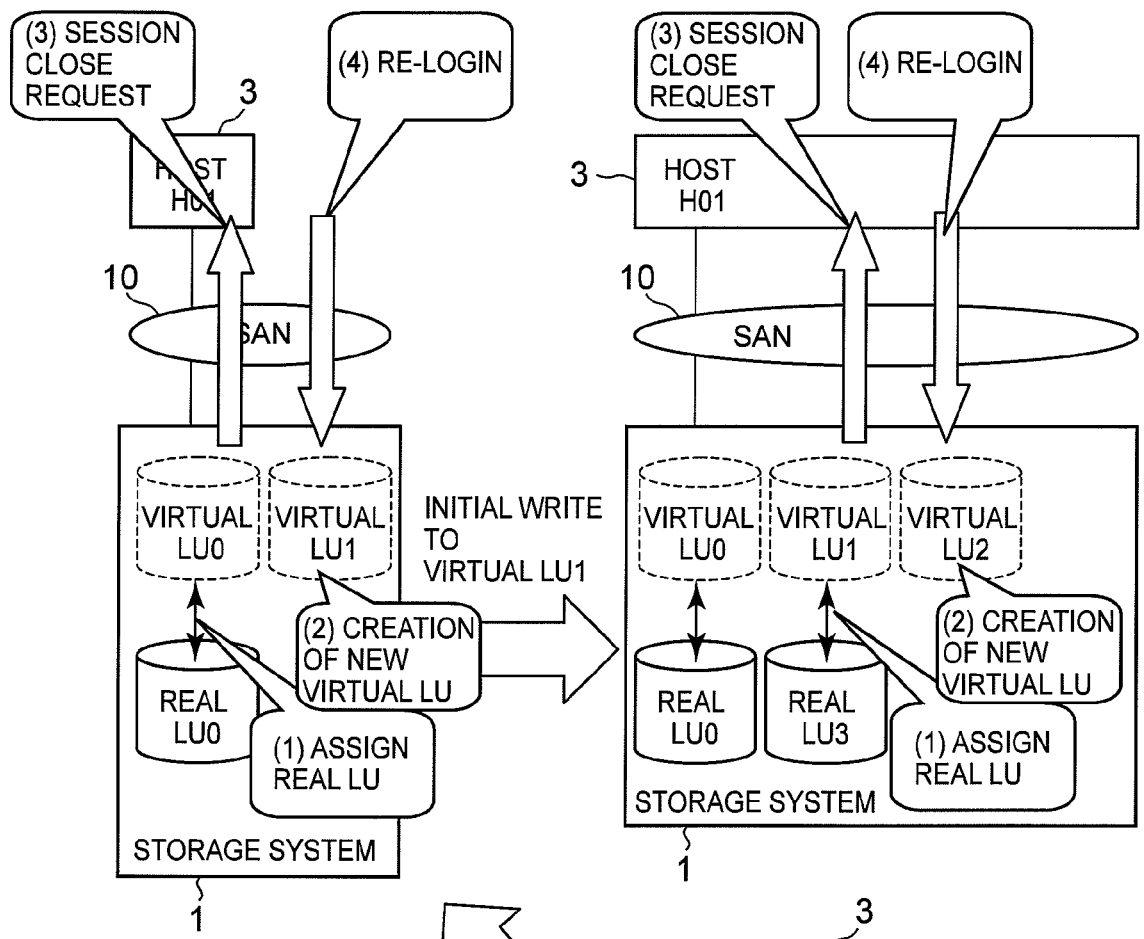
FIG. 3B is an explanatory diagram of an example of the processing that is executed when a write operation occurs for the first time to a virtual LU0 in FIG. 3A.
Figure 3C:
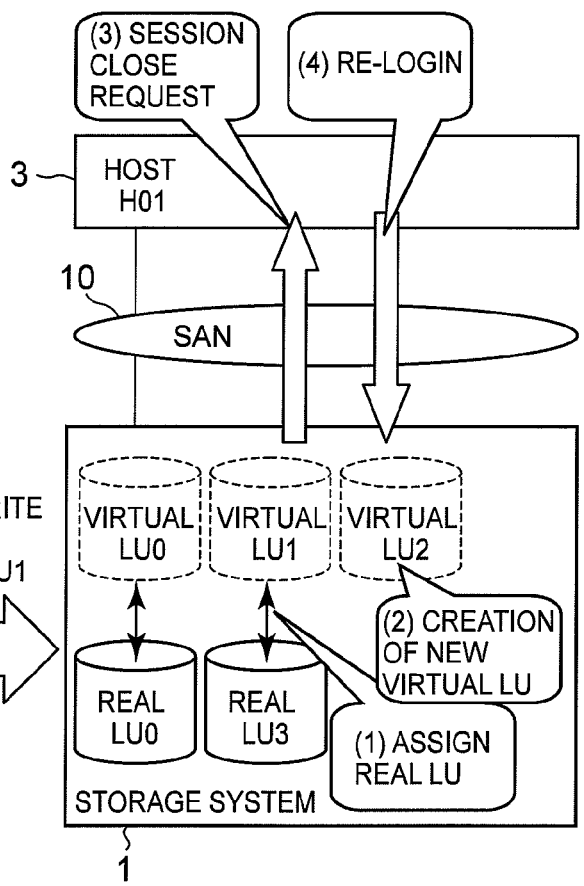
FIG. 3C is an explanatory diagram of processing that is executed when a write operation occurs for the first time to a virtual LU1 in FIG. 3B.
Figure 3A:
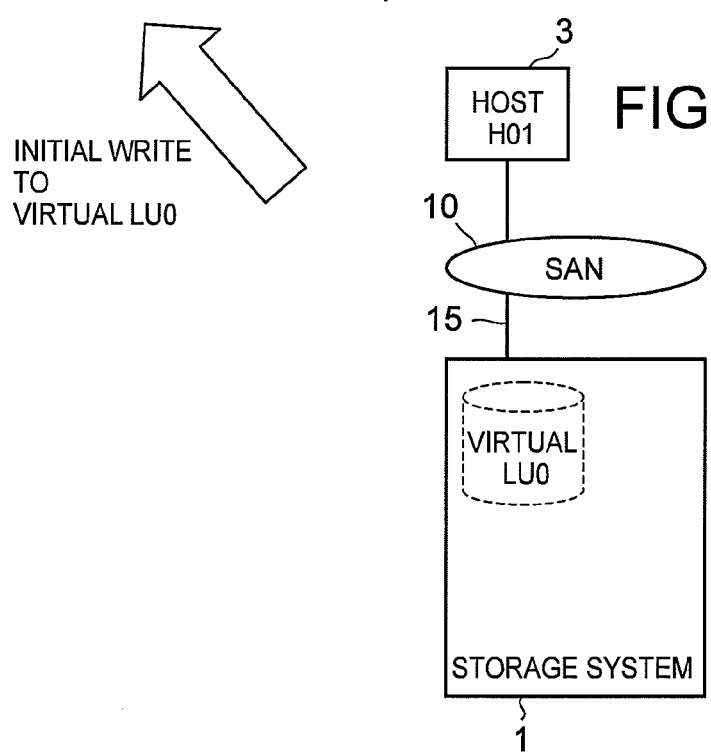
FIG. 3A shows an example of the state during installation of the host of the first embodiment of the present invention.

As shown in FIG. 3A, after the storage system 1 has been installed, virtual LU0 is provided for the host H01. Virtual LU0 may be prepared by the controller 107 when the controller 107 detects the host H01. Furthermore, only in cases where the virtual LU0 which is an initial virtual LU is prepared for the host H01, the controller 107 may receive an LU creation instruction from the management terminal 2 and prepare the virtual LU0 for the host H01 in response to the LU creation instruction. Further, when the virtual LU0 is prepared for the host H01, more specifically, as shown in FIG. 20A, for example, the following records are recorded in the host table 121, that is, "H01" is recorded as the host ID, "0" is recorded as the virtual LUN, and records in which "unassigned" is recorded for real LUN are added. Hence, because the number of records of the host table 121 increases by one when a virtual LU is newly prepared for a certain host, the size of the host table 121 increases when the virtual LUs prepared for the hosts increase.

When a write command designating a virtual LU0 is first received from the host H01, as shown in FIG. 3B, the controller 107 selects an unassigned real LU from among the plurality of real LU (real LU0, for example) and assigns the unassigned real LU to the virtual LU0 and then prepares a new virtual LU1 for the host H01. At this stage, the host table 121 is as shown in FIG. 2A and the LU table 122 is as shown in FIG. 2B. The controller 107 transmits a session close request to the host H01. If the host H01 performs re-login to the storage system 1 after closing the session in response to the session close request, the host H01 is provided with virtual LUN1 and, therefore, virtual LU1 is then newly visible.

In this processing, for example, the unassigned real LU can be specified by searching for a real LUN the status of which is "unassigned" from the LU table 122. Further, the controller 107 is able to write data conforming with the write command to real LU0 with arbitrary timing once real LU0 has been assigned to the virtual LU0. Further, in place of a session close request, any request that leads to re-login by the host is possible. Re-login is a second or subsequent login that is made with respect to the storage system 1 and possible words for the re-login include the initial login. A login (initial login or re-login) request is transmitted by the host to the storage system 1. When a session close request is transmitted, in the case of iSCSI, for example, an Asynchronous Message or TCP connection close request is transmitted. Further, when a virtual LU can be seen by the host, this signifies that a virtual LU is identified by the host, more specifically that the virtual LU is mounted in the host, for example and, even more specifically, that a specified computer program in the host (volume manager 12, for example) identifies the virtual LU, for example.

Figure 21A:
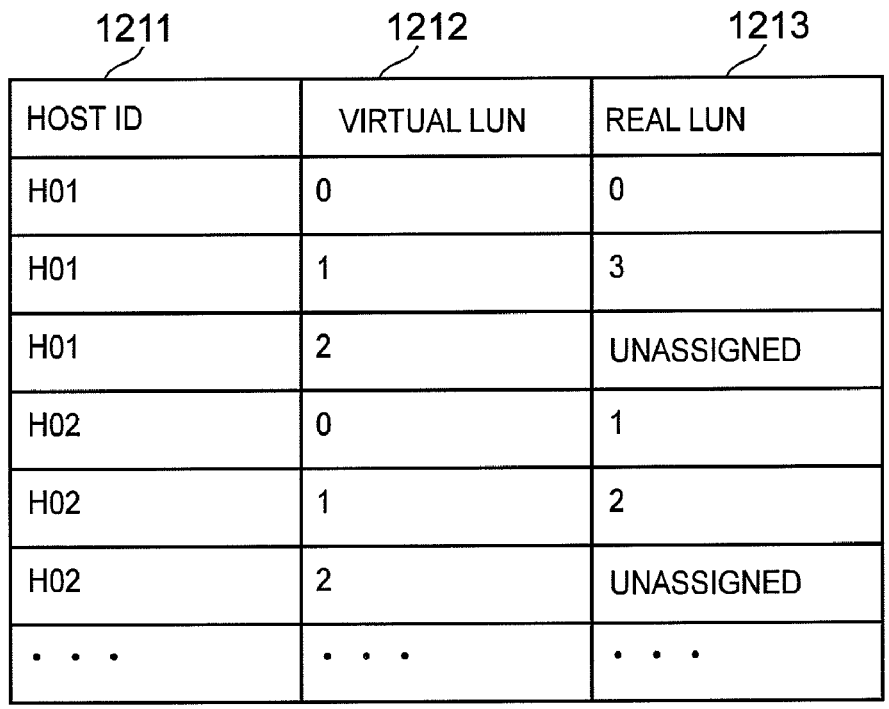
FIG. 21A shows the host table in FIG. 3C.
Figure 21B:
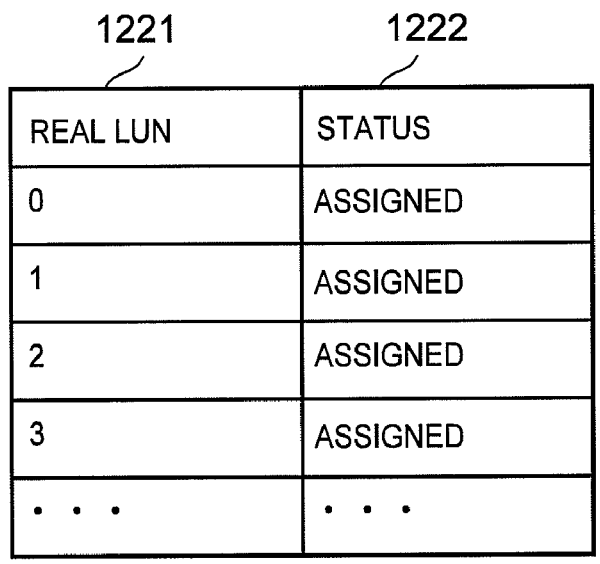
FIG. 21B shows the LU table in FIG. 3C.

Thereafter, upon receipt of the write command, the controller 107 writes data that conforms with the write command to the real LU0 assigned to the virtual LU0 in cases where the received write command designates the virtual LU0. Further, in cases where the received write command designates virtual LU1 to which a real LU has not been assigned, in other words, in cases where a write command designating the virtual LU1 is first received, the controller 107 performs the following processing. As shown in FIG. 3C, the controller 107 selects an unassigned real LU (real LU3, for example) from among the plurality of real LU, assigns the real LU to the virtual LU1, and prepares a new virtual LU2 for the host H01. At this stage, the host table 121 is as shown in FIG. 21A and the LU table 122 is as shown in FIG. 21B. The controller 107 transmits a session close request to the host H01. If the host H01 performs re-login with respect to the storage system 1 in response to the session close request, the host H01 is provided with the virtual LUN2 and, hence, a virtual LU2 is newly visible to the host H01.

Figure 4A:
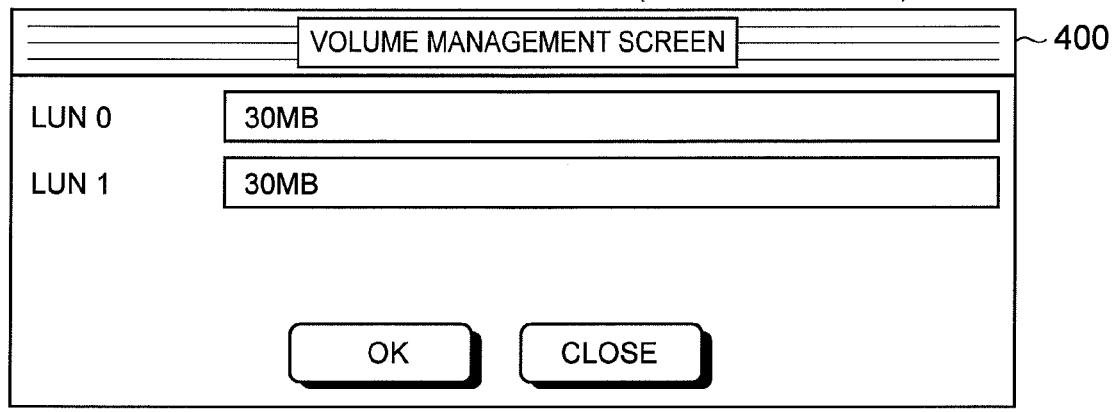
FIG. 4A is an example of a host management screen before re-login is performed in FIG. 3B.
Figure 4B:
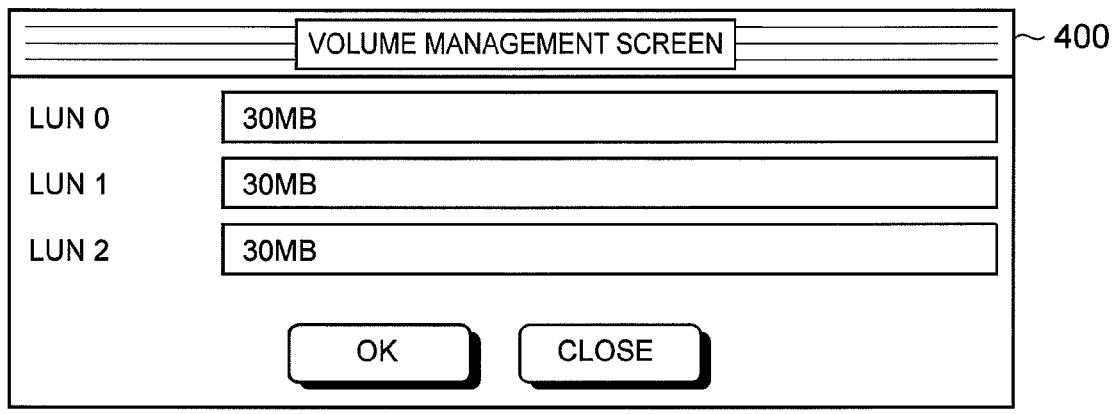
FIG. 4B is an example of a host management screen after re-login is performed in FIG. 3B.

Incidentally, in FIG. 3C, before re-login has taken place, for example, the volume manager 12 provides a management screen 400 (See FIG. 4A) that displays information relating to currently identified virtual LU0 and LU1 (the virtual LUN and virtual LU size, for example) in response to a request from the user of the host H01 or a host management terminal (details will be provided subsequently) that is connected to the host H01. However, after re-login has taken place, for example, the volume manager 12 provides a management screen 400 (See FIG. 4B) that displays information relating to the currently identified virtual LU0, LU1, and LU2 (the virtual LUN and virtual LU size, for example) in response to a request from the user of the host H01 or a host management terminal or the like that is connected to the host H01. If FIGS. 4A and 4B are compared, it is clear that virtual LU2 is newly prepared as a result of the re-login. Further, the virtual LU size is a fixed value such as 30 MB (megabytes) in this embodiment and, because the virtual LU and real LU correspond with one another one-for-one, the real LU size is also 30 MB. The virtual LU size and real LU size may be other values.

As mentioned earlier, in this embodiment, although an unassigned real LU is selected and assigned to a virtual LU when a write command that designates the virtual LU to which a real LU has not been assigned (sometimes called the 'backup virtual LU' hereinbelow) is first received, the controller 107 newly prepares a backup virtual LU for the host constituting the transmission source of the write command given that such a write command is received. Thereupon, the virtual LUN of the newly prepared backup virtual LU can be a number that does not overlap the virtual LUN of one or more virtual LU that have already been prepared for the host such as a LUN obtained by adding one to the virtual LUN with the largest number among the one or more virtual LUN, for example. Further, a possible criterion for newly preparing a backup virtual LU is when a write command that designates a backup virtual LU is first received, in other words, when a backup virtual LU has been exhausted, but another criterion may be adopted in place of the criterion. For example, if a plurality of backup virtual LUs are always prepared, one or two or more backup virtual LUs may be newly prepared with the criterion that there be a small spare capacity in the real LU assigned to a certain backup virtual LU.

Furthermore, in the above description, the initial state for the host H01 was the state shown in FIG. 3A but the initial state is not limited to the latter state. The state shown in FIG. 3B may be the initial state, for example. That is, at least one virtual LU to which a real LU has been assigned may initially be prepared for the host H01 in addition to one or more backup virtual LU.

Further, although a virtual LU to which a real LU has not been assigned served as the definition of a backup virtual LU in the above description, in a broader sense, a virtual LU that has not yet been designated even once by a write command may instead be adopted. In other words, in this embodiment, the criterion for assigning a real LU to a virtual LU is to first receive a write command designating the virtual LU. However, the criterion may instead be that a virtual LU be newly prepared for the host H01. In this case, the real LU is assigned to the virtual LU in advance of receiving a write command. Further, in this case, the initial state for the host H01, for example, may be a state where only a virtual LU to which a real LU has been assigned (that is, a virtual LU in a state where a write command designating the virtual LU has not yet been received) is prepared. Thereupon, the criterion for first receiving the write command designating the virtual LU may be that a virtual LU be newly prepared. A real LU may be assigned to the newly prepared virtual LU given that the virtual LU has been prepared and a real LU may be assigned given that a write command designating the virtual LU has first been received.

In the following description, a definition of a backup virtual LU is a virtual LU that has not yet been designated even once by a write command even if a real LU has been assigned or not to the virtual LU.

Further, in the description that references FIGS. 3A, 3B, and 3C, as methods for first preparing a backup virtual LU for the host H01 ('initial preparation method' hereinbelow), a few methods such as the following three methods, for example, may be considered.

Figure 16:
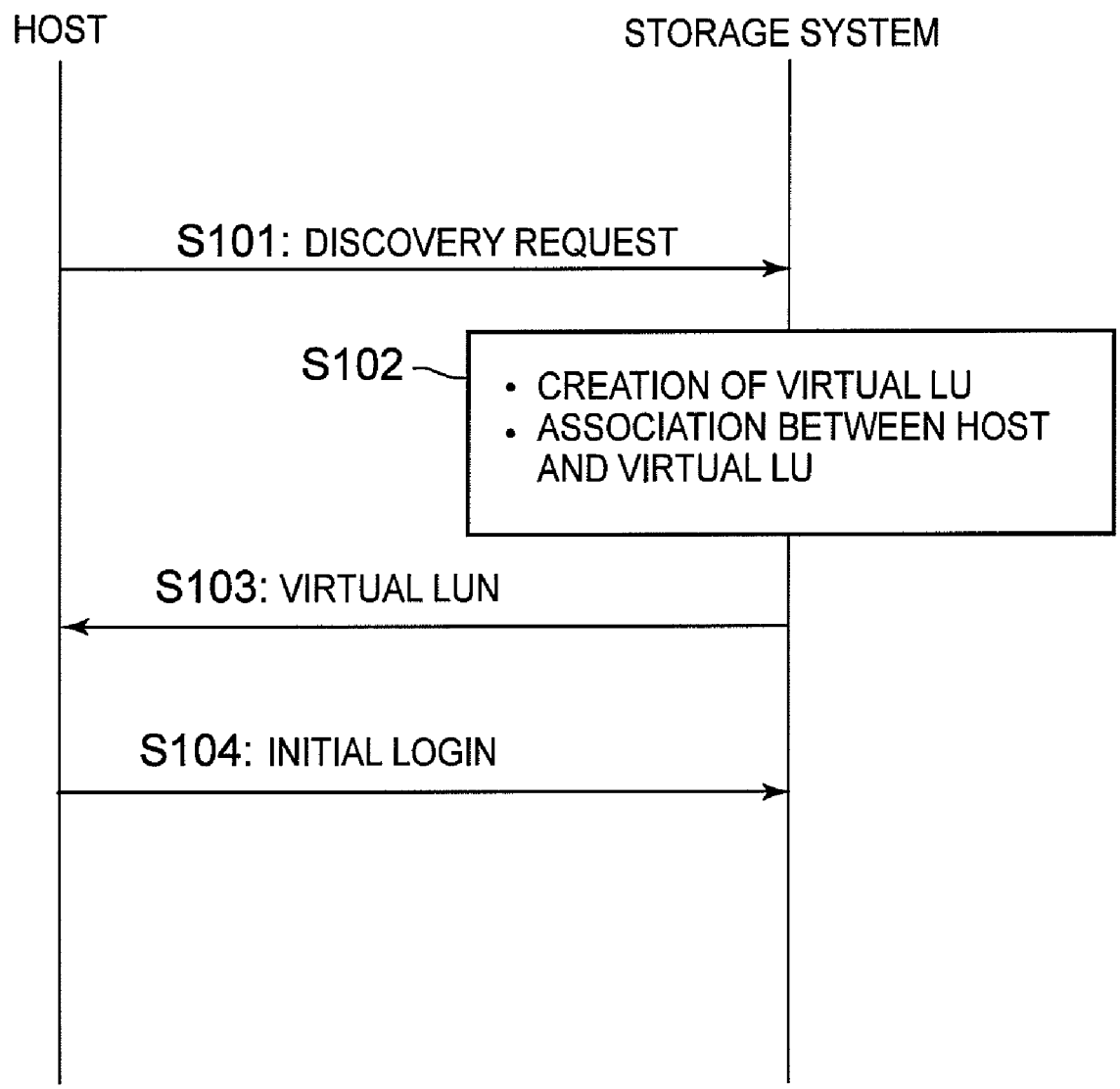
FIG. 16 is an example of the flow of processing that is executed when a first initial preparation method is executed in the first embodiment of the present invention.

The first initial preparation method is a method for preparing a virtual LU0 for the host H01 given that the controller 107 has first detected the host H01. An example of the flow of the processing performed by the first initial preparation method is shown in FIG. 16. In other words, the host H01 transmits a discovery request including information of a predetermined kind (the IP address of the storage system 1, for example) to the storage system 1 (S101). The controller 107 prepares a virtual LU0 for the host H01 in response to the discovery request, associates the host H01 and virtual LU0 (S102), and transmits the virtual LUN0 of the prepared virtual LU0 to the host H01 (S103). The volume manager 12 of the host H01 is able to identify the virtual LU0 by performing an initial login that includes the virtual LUN0 received from the storage system 1 with respect to the storage system 1 via the OS11 (transmits a login request to the storage system 1) (S104).

Figure 17:
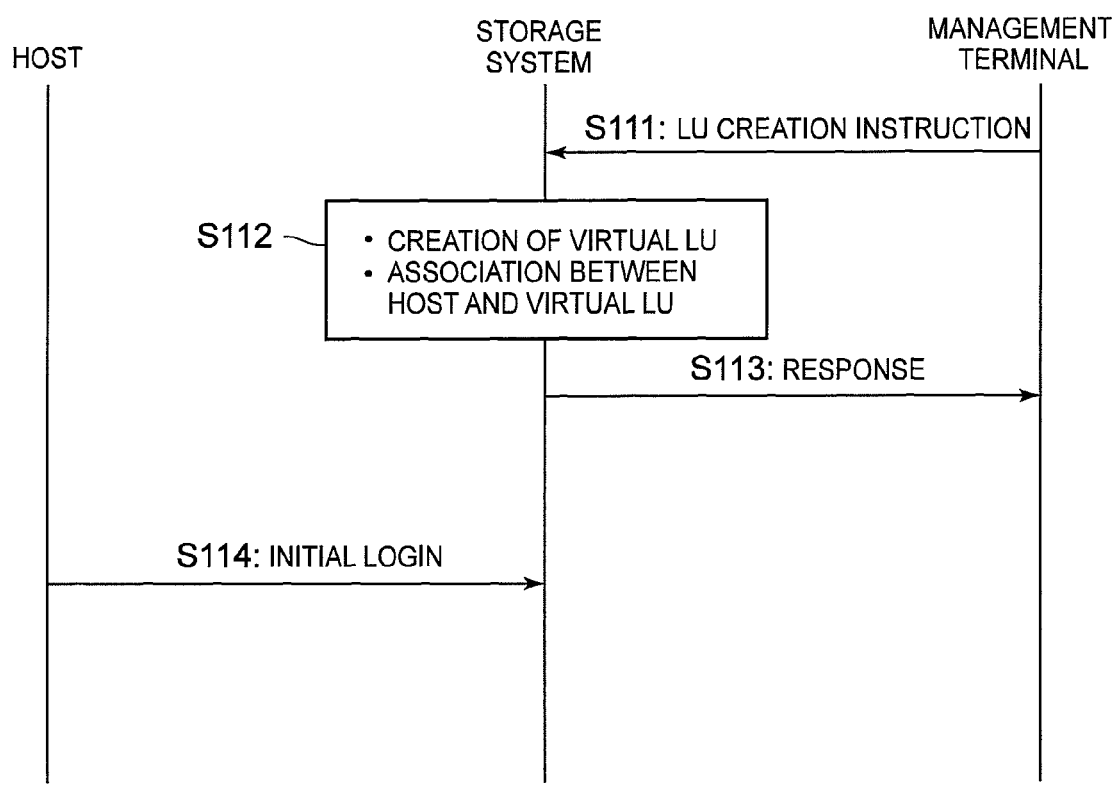
FIG. 17 is an example of the flow of processing that is executed when a second initial preparation method is executed in the first embodiment of the present invention.

The second initial preparation method is a method of preparing virtual LU0 for the host H01 given that an LU creation instruction has been received from the management terminal 2. An example of the flow of processing that is carried out by the second initial preparation method is shown in FIG. 17. That is, the management terminal 2 transmits an LU creation instruction containing the host ID "H01" of the host H01 (S111) The controller 107 prepares a virtual LU0 for the host H01 in response to the LU creation instruction, associates the host H01 and virtual LU0 (S112), and sends back a response to the management terminal 2 (S113). The volume manager 12 of the host H01 is able to identify the virtual LU0 by transmitting a login request containing the virtual LUN0 to the storage system 1 via the OS11 (performing an initial login) (S114). Further, in the second initial preparation method, the volume manager 12 is able to learn of the virtual LUN0 of the virtual LU0 as a result of an input or the like from the user.

Figure 19A:
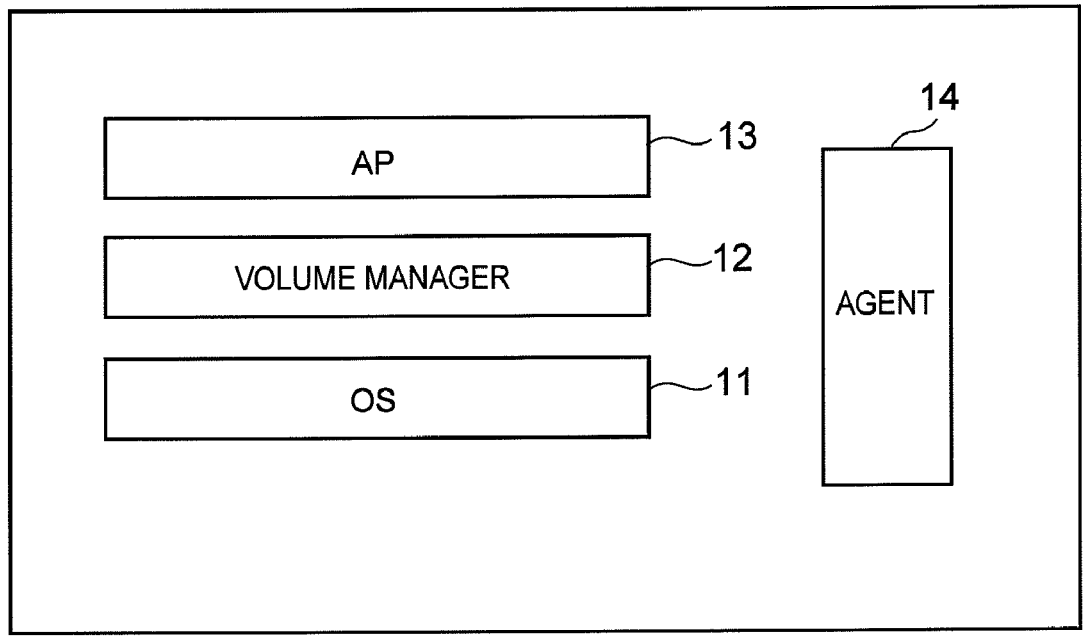
FIG. 19A shows another example of a plurality of computer programs that are provided for the host in the first embodiment of the present invention.
Figure 19B:
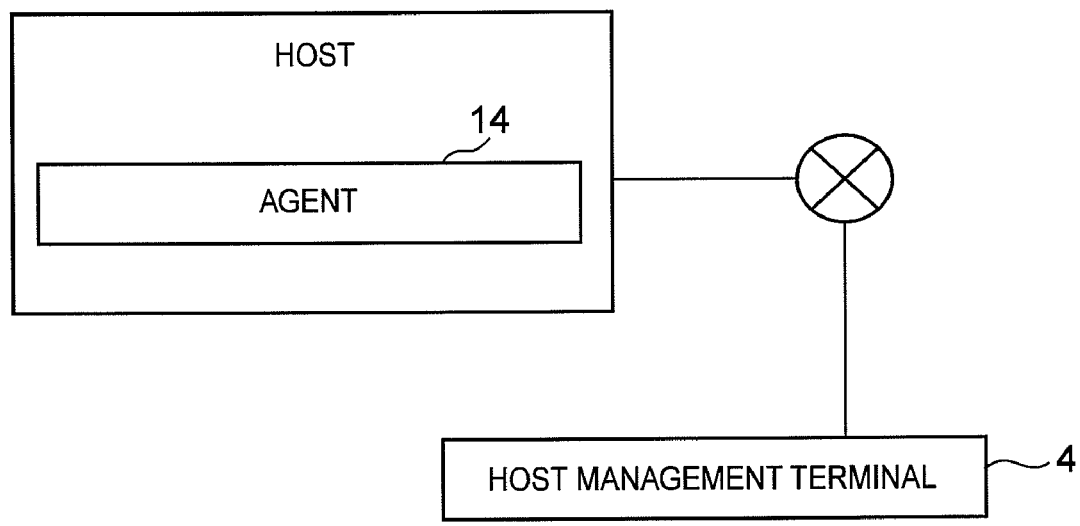
FIG. 19B shows a constitutional example of the computer system in which there is a host management terminal which is connected to the host in the first embodiment of the present invention.

Further, according to the second initial preparation method, the management terminal 2 can be replaced with an agent program 14 of the host H01. For example, as shown in FIG. 19A, the agent program 14 is stored in a storage resource of the host H01 and the agent program 14 may transmit an LU creation instruction to the storage system 1 in response to the instruction from a host management terminal 4 as exemplified in FIG. 19B. In this case, for example, in the constitution of FIG. 1, there is no management terminal 2 or management port 109. Further, the operator of the host management terminal 4 can also be called the 'host administrator' whereas the operator of the management terminal 2 is also called the 'storage administrator'.

Figure 18:
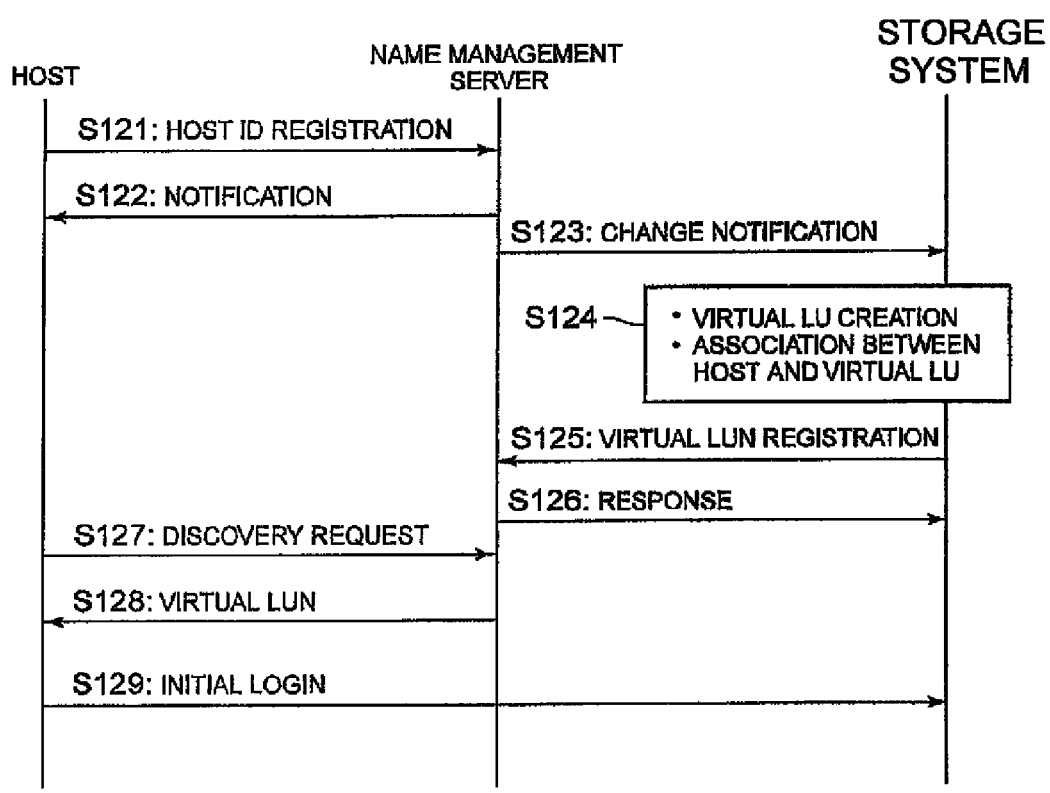
FIG. 18 is an example of the flow of processing that is executed when a third initial preparation method is executed in the first embodiment of the present invention.

A third initial preparation method is a method that utilizes a specified server such as a name management server (iSNS (internet Storage name service) server), for example. An example of the flow of the processing that is performed by means of the third initial preparation method is shown in FIG. 18. That is, the host H01 registers its own ID "H01" in the name management server (S121) and receives notification of the completion of registration from the name management server (S122). The name management server notifies the newly registered ID "H01" to the storage system 1 (S123). The controller 107 prepares the virtual LU0 for the host H01 in response to the notification, associates the host H01 and virtual LU0 (S124), registers the virtual LUN0 corresponding with the host H01 in the name management server (S125), and receives a response from the name management server (S126). In the name management server, the host ID "01" and virtual LUN "0" are associated. The host H01 transmits a discovery request containing information of a predetermined kind (the IP address of the name management server, for example) to the name management server (S127). The name management server transmits a virtual LUN0 that corresponds to the host H01 to the host H01 in response to the discovery request (S128). The volume manager 12 of the host H01 is able to identify the virtual LU0 by transmitting a login request containing a virtual LUN0 received from the name management server to the storage system 1 via the OS11 (by performing an initial login) (S129). Further, information registered in the name management server may be the iSCSI name instead of the virtual LUN.

In steps 102, 112, and 124 of the first to third initial preparation methods above, the host registration program 111 is able to execute the host registration processing exemplified in FIG. 5. In the following description, the initial state for the host H01 when the initial preparation method is concluded is the state of FIG. 3B.

In step 5001, the host registration program 111 determines the host ID. The host ID thus determined can be the ID specified by the discovery request in step 102. In step 112, the ID can be an ID that is arbitrarily determined in response to the LU creation instruction or an ID that is specified by the LU creation instruction. In step 124, the ID can be an ID that is specified by the notification from the name management server.

In step 5002, the host registration program 111 retrieves one or more unassigned real LU from the LU table 122, selects an unassigned real LU (the real LU0, for example) from the one or more unassigned real LUs thus retrieved and changes the status corresponding to the selected real LU to "assigned".

In step 5003, the host registration program 111 adds a record in which the host ID "H01", an arbitrary virtual LUN (virtual LUN "0", for example), and the real LUN (real LUN "0", for example) corresponding to the real LU selected in S5002 to the host table 121.

In step 5004, the host registration program 111 adds a record in which the host ID "H01", an arbitrary virtual LUN (virtual LUN "1", for example) and "unassigned" for the real LUN are recorded to the host table 121. That is, the host registration program 111 prepares a virtual LU to which a real LU has not been assigned for the host H01.

An example of the host registration processing was described hereinabove. For example, if the initial state of the host H01 is the state shown in FIG. 3A, for example, steps 5002 and 5003 are not required and, in step S5004, a virtual LU to which a real LU has not been assigned may be prepared. Further, for example, step 5004 need not be performed in at least the host registration processing (in this case, given that write operation is first performed to the virtual LU prepared in step 5003, for example, the processing corresponding to step 5004 may be executed by a CPU according to means of another computer program).

Figure 6:
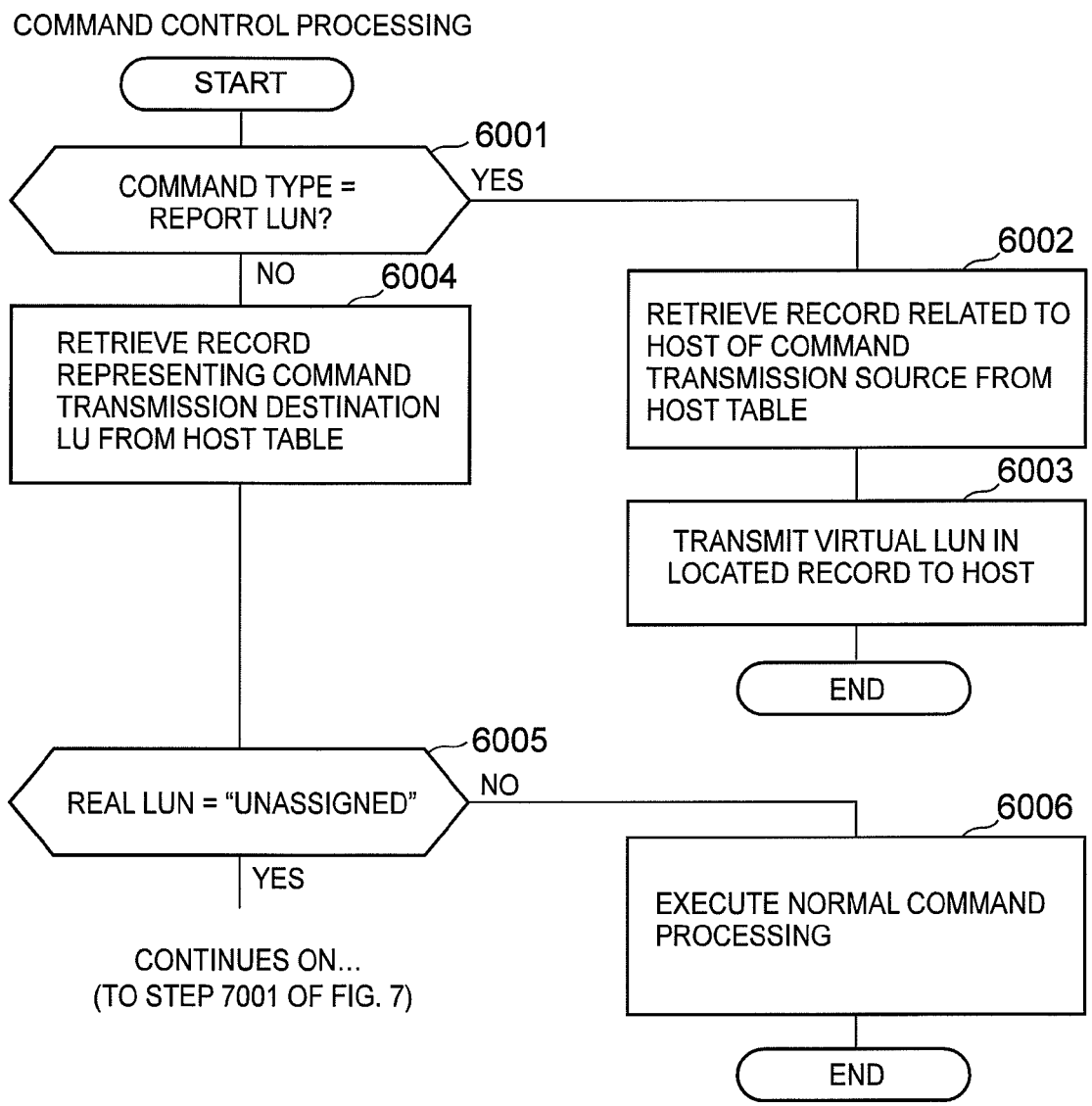
FIG. 6 shows part of an example of the flow of command control processing that is executed by a CPU according to the command control program of the first embodiment of the present invention.
Figure 7:
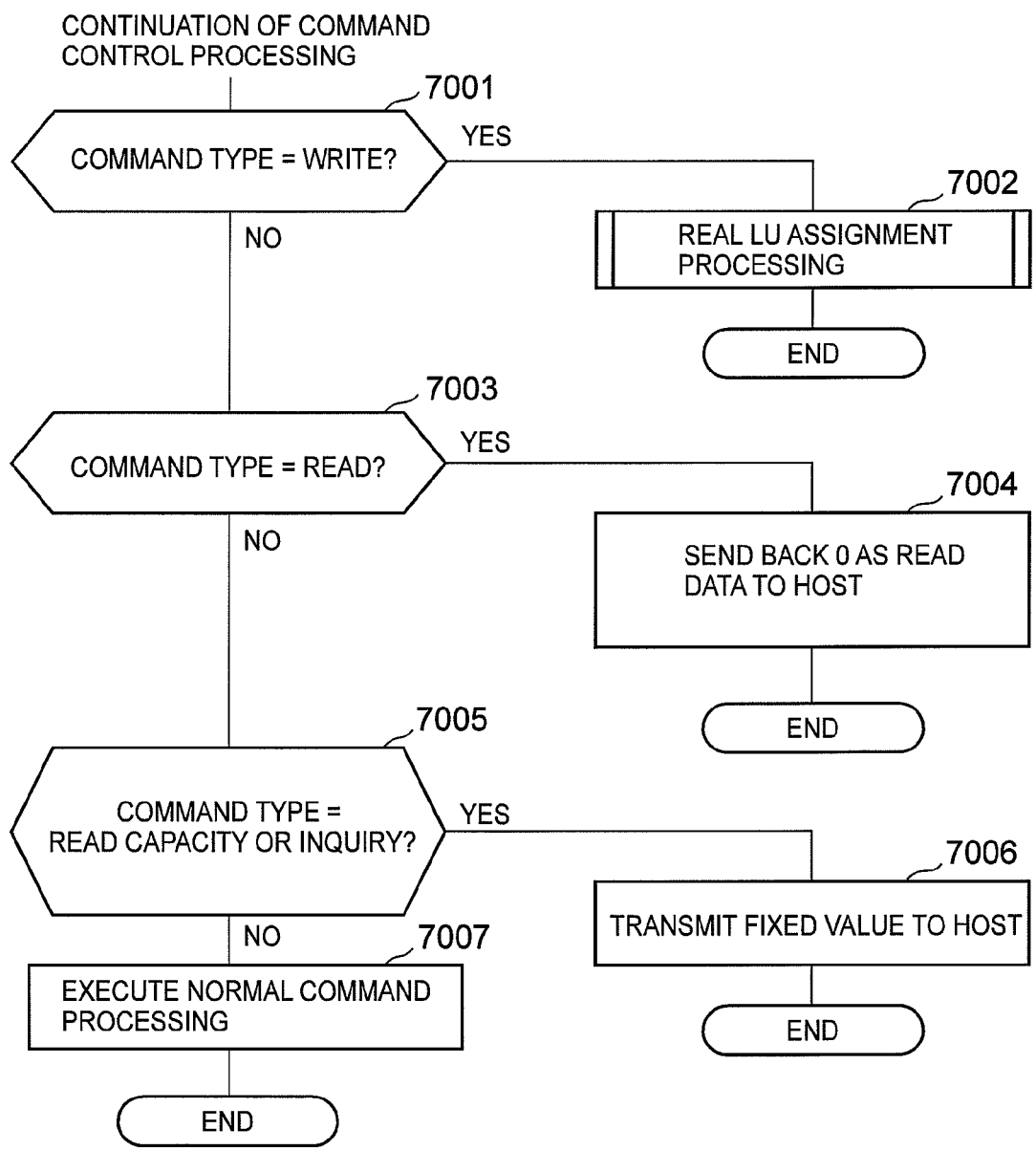
FIG. 7 shows the remaining part of the example of the flow of command control processing that is executed by a CPU according to the command control program of the first embodiment of the present invention.

An example of the flow of command control processing executed by a CPU according to command control program 112 will now be illustrated by means of a combination of FIGS. 6 and 7.

The command control program 112 analyzes the command received by the controller 107 from the host and executes step 6002 when the command is a Report LUN (Yes in step 6001). That is, the command control program 112 retrieves a record containing the ID of the transmission source host of the command (Report LUN) from the host table 121. Further, in step 6003, the command control program 112 transmits a virtual LUN in each record found to the transmission source host.

When a command received by the controller 107 from the host is not a Report LUN (No in step 6001), the command control program 112 searches for a record in which the virtual LUN designated by the received command is recorded from the host table 121 (step 6004). As a result, if the value of the real LUN recorded in the record thus found is "unassigned" (YES in step 6005), the processing moves on to step 7001 in FIG. 7. On the other hand, if the value of the real LUN recorded in the record thus found is "assigned" (No in step 6005), the command control program 112 executes processing according to the received command (normal command processing) (step 6006). For example, if the command is a write command, the command control program 112 temporarily stores write target data corresponding with the write command to the cache memory 110 and writes the data that was temporarily stored in the cache memory 110 to the virtual LU designated by the write command. Further, if, for example, the command is a read command, the command control program 112 reads the read target data conforming with the read command from the virtual LU designated by the read command and temporarily stores the data to the cache memory 110, and transmits the data that was temporarily stored in the cache memory 110 to the read command transmission source host.

Figure 8A:
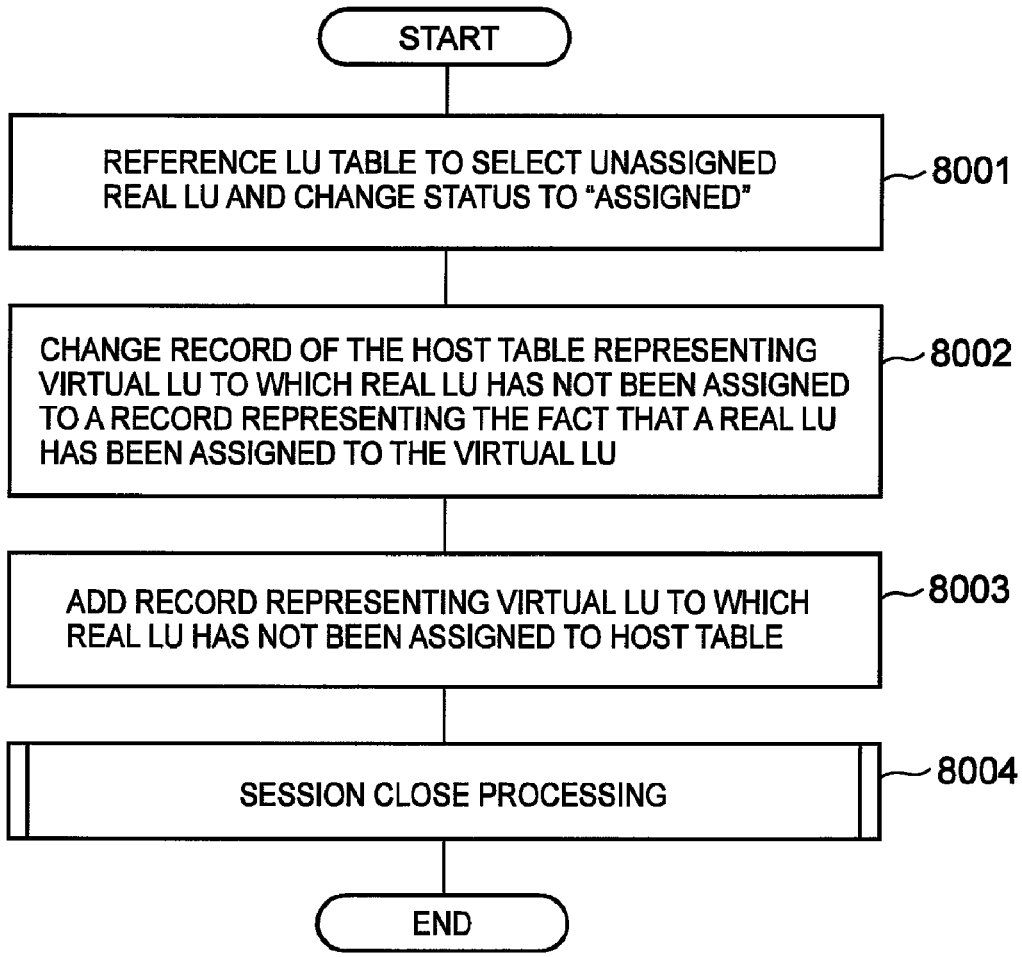
FIG. 8A shows an example of the flow of real LU assignment processing that is executed by a CPU according to the virtual LU control program of the first embodiment of the present invention.

In step 7001 of FIG. 7, the command control program 112 executes real LU assignment processing (the details of which are shown in FIG. 8A) by calling up the virtual LU control program 113 in step 7002 if the received command is a write command (Yes in step 7001). On the other hand, if the received command is not a write command (No in step 7001), the processing moves to step 7003.

In step 7003, if the received command is a read command (Yes in step 7003), the command control program 112 sends back a 0 as the read data to the transmission source host of the read command in step 7004. Instead, errors may be notified to the transmission source host using another method. On the other hand, if the received command is not a read command (No in step 7003), the processing moves to step 7005.

In step 7005, the command control program 112 transmits a fixed value to the transmission source host of the command in step 7006 if the received command is a Read Capacity or Inquiry command (Yes in step 7005). Fixed values are, for example, the virtual LU size (the 30 MB mentioned above, for example) if the command is a Read Capacity command, and the manufacturer's name and fabrication number of the storage system 1 if the command is an Inquiry command. If the received command is not a Read Capacity or Inquiry command (No in step 7005), the command control program 112 executes processing in accordance with the received command (normal command processing) in step 7007.

FIG. 8A shows an example of the flow of real LU assignment processing that is executed by a CPU according to the virtual LU control program 113.

In step 8001, the virtual LU control program 113 selects an unassigned real LU from the LU table 122 (that is, selects an "unassigned" real LUN) and changes the status of the selected real LU to "assigned".

In step 8002, the virtual LU control program 113 changes the record representing a virtual LU of the host table 121 to which a real LU has not been assigned to a record that represents the fact that a real LU has been assigned to the virtual LU. More specifically, for example, the virtual LU control program 113 changes "unassigned" of a record of the host table 121 for which a real LUN is "unassigned" (record in which the host ID of the transmission source host of the write command has been recorded) to a real LUN the status of which became "assigned" in step 8001.

In step 8003, the virtual LU control program 113 adds a record representing a virtual LU to which a real LU has not been assigned (a record in which the host ID of the transmission source host of the write command is recorded) to the host table 121.

In step 8004, the virtual LU control program 113 calls up the session control program 114 (that is, executes session close processing).

Figure 8B:
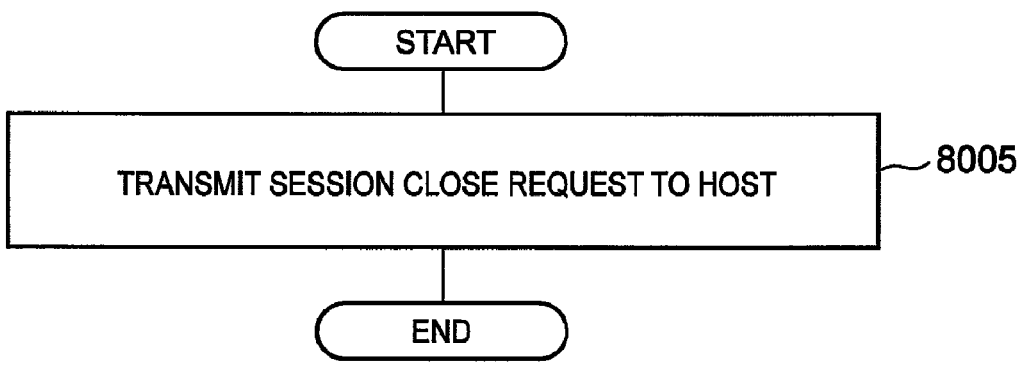
FIG. 8B shows an example of the flow of session close processing that is executed by a CPU according to the session control program of the first embodiment of the present invention.

FIG. 8B shows an example of the flow of session close processing that is executed by a CPU according to the session control program 114.

In step 8005, the session control program 114 transmits a session close request to the transmission source host of the write command. As a result, the transmission source host is able to newly identify the virtual LU that was prepared in step 8003 of FIG. 8A by performing re-login with respect to the storage system 1 in response to the session close request. Further, in cases where re-login is performed when a write command designating virtual LU1 is transmitted, for example, if the transmission source host transfers the write command to the storage system 1, the write target data corresponding with the write command come to be written to the real LU assigned to the virtual LU1.

The first embodiment was described hereinabove.

According to the above first embodiment, one or more backup virtual LU are always prepared for the host. More specifically, when a host is newly installed, for example (in other words, when a virtual LU is first prepared for the host), if a predetermined request that does not contain a designation of the number and size of the LU is transmitted by the host or management terminal or the like, a backup virtual LU is prepared for the host. Thereafter, given that writing is first made from the host to the backup virtual LU, the backup virtual LU is newly prepared for the host and such processing is executed each time write operation is first performed with respect to the backup virtual LU. That is, when a host is newly installed or after installation, the configuration of logical resource information on the number and size of the LU need not be performed in order to provide the host with the LU. Hence, a storage system is easily installed even in enterprises where the administrator with specialized knowledge relating to the storage system is not present.

Furthermore, according to the first embodiment, one or more backup virtual LU are always prepared for the host. In other words, a backup virtual LU is newly and automatically prepared and supplied to the host in cases where the backup virtual LU appears to be exhausted. For this reason, the probability that the virtual LU will be exhausted for the host (that there will be no virtual LU with spare capacity) can be reduced even when the configuration of logical resource information that adds an LU to the host has not been performed.

As another method for preventing the configuration of logical resource information as far as possible, a method that first assigns the maximum number of virtual LU that can be assigned to one host to each of the maximum number of hosts that can be connected to the storage system 1 as virtual LU that are provided by Thin Provisioning technology may be considered. However, when another method is adopted, a memory with a sufficiently large capacity and, more specifically, a memory with a capacity that is capable of storing a table for managing region assignment for the maximum number of hosts×maximum number of virtual LUs, for example, is required. According to this embodiment, LU management (the storage of host table 121 and LU table 122, for example) can be performed by means of a memory with a smaller capacity by means of this other method.

Further, according to the first embodiment, the following variety of modifications as described below will be considered, for example.

<First Modification> The virtual LU may be a virtual LU that is provided by means of the Thin Provisioning technology. The assignment units may be real LU unit or may be units of a plurality of storage regions constituting a real LU (real regions). In the case of real LU units, a plurality of real LUs can be assigned to one virtual LU. In this case, a column in which the storage region (address range) of the virtual LU is recorded may be prepared for the host table 121, for example. Thus, it is possible to record which real LU is assigned to which storage region of which virtual LU for a particular host in the host table 121. As Thin Provisioning technology, a technology disclosed in Japanese Patent Application Laid Open No. 2003-15915 (U.S. Pat. No. 6,725,328, U.S. Pat. No.

6,836,819, and U.S. application Ser. No. 10/991,421), for example, can be adopted as the Thin Provisioning technology.

<Second Modification> The virtual LU may be a virtual LU that conforms with the so-called external connection technology. In concrete terms, the real LU may exist in an external storage system that is connected to the storage system 1, for example. In this case, the write target data that conforms with the write command to the virtual LU are written to an external real LU that corresponds with the virtual LU. As the external connection technology, for example, the technology disclosed in Japanese Patent Application Laid Open No. 2005-107645 (U.S. application Ser. No. 10/769, 805 and the U.S. application Ser. No. 11/471,556) can be adopted. Further, in the modification, the storage system 1 does not have to be provided with the disk device 3. Further, the controller 107 may be a switch device such as a Fiber channel switch or the like.

<Third Modification> The virtual LU may be prepared in another higher-level section such as a task or an application instead of being prepared for the host. When the higher-level section is a task, one task can be executed by a CPU according to one or more application programs, for example. Therefore, correspondence between a task ID and one or more application IDs each corresponding with one or more application programs and correspondence between an application ID that indicates which application exists in which host and a host ID may be recorded in a table or the like. In this case, when a write command designating a certain virtual LU is received, the controller 107 specifies the task to which the transmission source application of the write command belongs and, if the task is the abovementioned initial write operation to a certain virtual LU, the controller 107 may newly prepare a virtual LU for the task.

<Fourth Modification> The storage system 1 may be constituted such that each of the pre-installed plurality of disk drives 103 is non-removable at the installation destination site of the storage system 1 (in other words, cannot be exchanged). As a non-removable constitution, for example, a plurality of disk drives 103 may be covered by means of a cover so that a person at the installation destination site of the storage system 1 is unable to exchange the disk devices 103 using a manual operation. A constitution in which a predetermined number (two, for example) of expansion slots (a slot from which and into which the disk devices 103 can be removed/installed, for example) are prepared for the storage system 1 to increase the disk drives 103 by a predetermined number is also possible.

<Fifth Modification> The above computer system may be a mainframe-related computer system. Further, the storage system 1 may be a NAS (Network Attached Storage) device and, in this case, the controller 107 may be a NAS head.

<Sixth Modification> Policy information which is information in which a policy related to the preparation of a virtual LU is recorded may be stored in the nonvolatile memory 100. As the policy, for example, a policy that defines the number and/or which capacity of virtual LU are prepared for which type of higher-level section (any of a host, application, and task, for example and, furthermore, what type of host, application or task) is prepared. In this case, the virtual LU control program 113 may control (may determine) the number and/or capacity of virtual LU that is prepared for the higher-level section (host, for example) on the basis of what kind of higher-level section the initial write command for a certain virtual LU is for and on the basis of the policy information.

Second Embodiment

The second embodiment of the present invention will be described with an emphasis on the differences from the first embodiment and a description of points in common with the first embodiment will be omitted or simplified.

Figure 9:
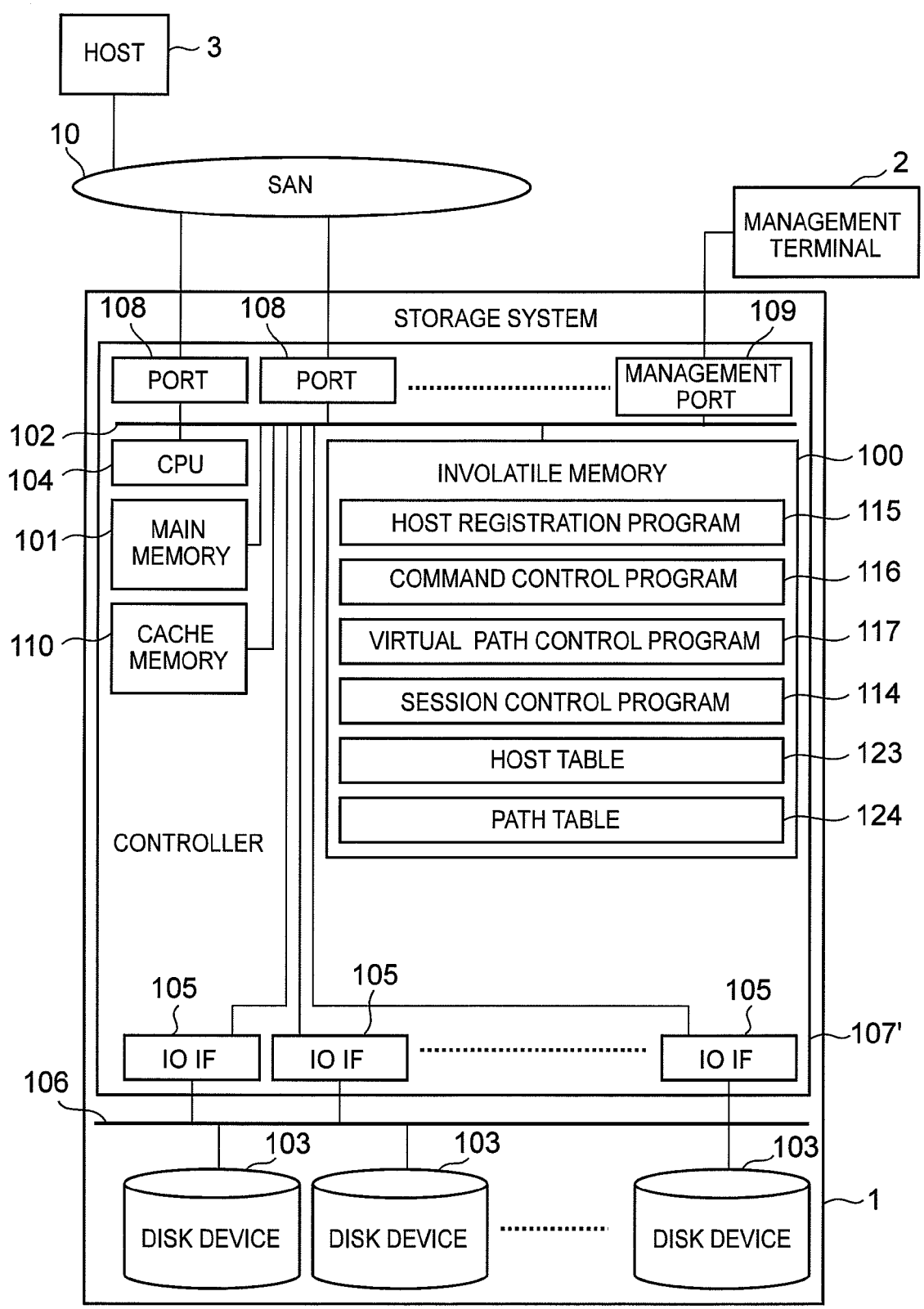
FIG. 9 shows a constitutional example of a computer system according to a second embodiment of the present invention.

FIG. 9 is an example of the computer system according to the second embodiment of the present invention.

As mentioned earlier, the second embodiment is an embodiment for a case where the logical resource is a path. In the second embodiment, the controller 107' invariably shows one or more virtual paths to which a real path has not been assigned for the host computer 3. When the host 3 issues an I/O command that passes via this virtual path, the controller 107' assigns a real path to the virtual path and additionally creates a virtual path to which a real path has not been assigned. As a result, in cases where the host administrator adds a path in order to increase the I/O throughput, for example, the host administrator only changes the path configuration on the host side and is able to obviate the need to configure logical resource information for the storage system 1.

In the second embodiment, instead of the host registration program 111, the command control program 112, the virtual LU control program 113, the host table 121, and the LU table 122 of the first embodiment, a host registration program 115, command control program 116, virtual path control program 117, host table 123, and LU table 124 are stored in the involatile memory 100.

FIG. 10A shows a constitutional example of the host table 123.

The host table 123 has a column 1231 in which the host ID is recorded, a column 1232 in which the ID of the virtual path is recorded and a column 1233 in which the ID of the real path is recorded. The respective records (rows) of the table 123 record the host ID, the ID of the virtual path, and the ID of the real path. It can be seen from this table 123 which virtual path is assigned to which host and which real path is assigned to that virtual path or that a real path has not been assigned to the virtual path ("unassigned").

FIG. 10B shows a constitutional example of the path table 124.

The path table 124 has a column 1241 in which the ID of the real path is recorded, a column 1242 in which the port ID is recorded, a column 1243 in which the LUN is recorded, and a column 1244 in which the path-related status is recorded. The ID of the real path, and the port ID, the LUN, and the status thereof are recorded in each record (row) of the table 124. It can be seen from table 124 that each real path is constituted by a combination of a particular port and a particular LU and that the real path is "assigned" or "unassigned". According to this table 124, when a real path with the ID "0" (real path 0 hereinbelow) is assigned to a certain virtual path, for example, the I/O conforming with the I/O command from the host using the virtual path is produced for the real LU corresponding with the LUN0 constituting the real path 0. In this embodiment, a real path is a path represented by a combination of a port ID and LUN whereas a virtual path is a path for which a combination of a port ID and LUN is unnecessary. The LUN is the LUN of the real LU in this embodiment. In other words, the mechanism of this embodiment is mainly not only a mechanism for obviating the need to configure LU-related logical resource information as far as possible but also a mechanism for obviating the need to configure path-related logical resource information as much as possible. Naturally, the second embodiment may also be combined with the first embodiment. In such a case, the LUN recorded in the path table 124 can be a virtual LUN.

The path table 124 shown in FIG. 10B signifies the fact that the controller 107' adds records representing paths between the real LU and all the ports 108 when the storage administrator creates a real LU. For example, in cases where there are four of the port 108, namely, P00, P01, P02, and P03, when LU0 is created by the storage administrator, the controller 107' adds records representing four real paths, namely, P00-LU0, P01-LU0, P02-LU0, and P03-LU0 to the path table 124. Further, although not especially illustrated, when LU1 is newly created by the storage administrator, the controller 107' further adds records representing four new real paths, namely, P00-LU1, P01-LU1, P02-LU1, and P03-LU1 to the path table 124. In other words, whenever a real LU is newly created, real paths in a number equal to the number of ports 108 are newly created. In contrast, for example, a plurality of real LU are prepared for the storage system 1 at the time of shipping and, consequently, a plurality of real LUN each corresponding with this plurality of real LU exist beforehand and, at the time of shipping, real paths in a quantity equal to (the number of ports 108)×(the number of real LUN), that is, respective real paths each containing all of the port IDs and all of the real LUN may be prepared.

An overview of an example of the flow of processing that is carried out in this embodiment will be described hereinbelow with reference to FIGS. 11A and 11B. Further, in each of FIGS. 11A and 11B, the virtual paths are indicated by a dotted line, the real paths assigned to the virtual paths are indicated by bold lines, and an illustration of real paths that have not been assigned to virtual paths is omitted.

Figure 12A:
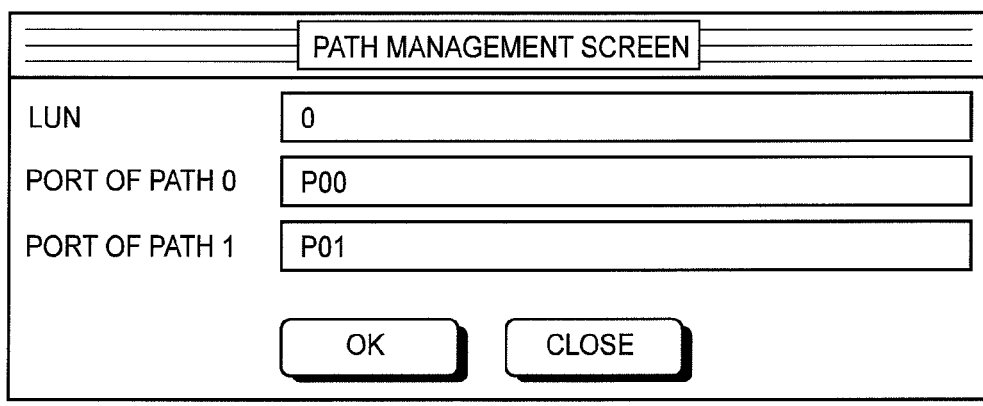
FIG. 12A is an example of the host management screen prior to re-login in FIG. 11B.

As shown in FIG. 11A, suppose that, at the time the host H01 is installed, real LU0 is identified by host H01 and the virtual path 0 to which real path 0 has been assigned and virtual path 1 to which a real path has not been assigned are also identified. The identification by host H01 does not extend to determining that the path via which the host H01 itself identifies is a virtual path. The storage resource of host H01 stores, for example, a computer program called a path manager which is executed by the CPU of the host H01. The path manager manages the identified path and, in the state shown in FIG. 11A, is able to display the management screen 1200 exemplified in FIG. 12A. Information relating to the path via which the path manager of the host H01 is identified, such as, for example, the LUN "0", the ID "P00" of the port constituting the virtual path 0 for which LUN "0" is a constituent element, and the ID "P01" of the port constituting the virtual path 1 for which the LUN "0" is a constituent element are displayed on the management screen 1200. For example, when an I/O command is issued in accordance with the SCSI (including iSCSI) protocol, it is possible to issue a command that contains, as parameters, a port ID (a number, for example), a LUN, and an LBA (logical block address). However, in that case, the path is designated by means of a combination of the port ID and LUN. In this embodiment, because all the real paths are constituted through the association of all the port IDs with one LUN, in one host, the maximum number of identifiable paths per LUN is the number of ports that the controller 107' comprises.

Figure 12B:
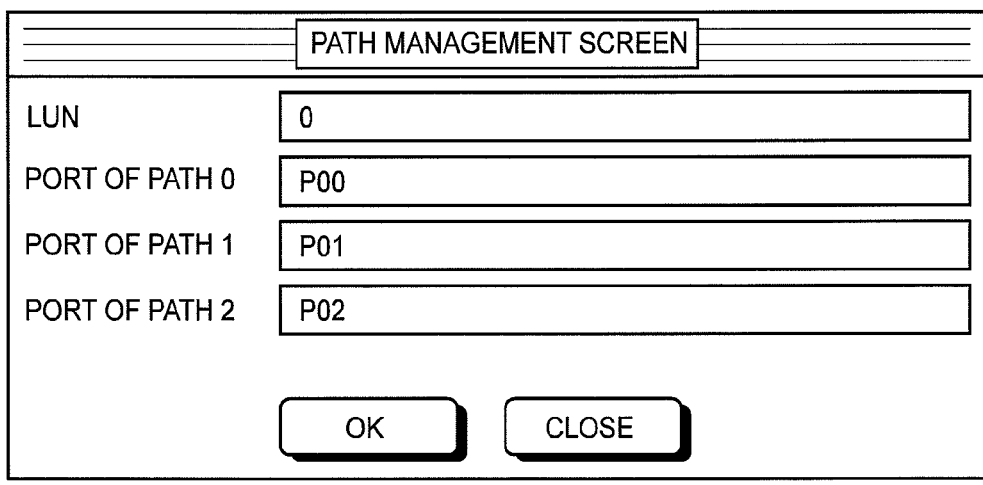
FIG. 12B is an example of the host management screen after re-login in FIG. 11B.

In the state of FIG. 11A, the controller 107' executes the processing shown in FIG. 11B in cases where a command containing LUN "0" and the port ID "P01" is received, in other words, in cases where a command is received via the virtual path 1. In other words, the controller 107' selects an unassigned real path (real path 1, for example) among a plurality of real paths containing LUN0 and assigns the selected real path 1 to the virtual path 1. Furthermore, the controller 107' prepares a new virtual path 2 and assigns the new virtual path 2 to the host H01. The controller 107' then transmits a session close request to the host H01 which is the transmission source of the command. Host H01 receives the session close request from the controller 107' and, in response to the session close request, transmits a re-discovery request to the storage system 1 after closing the session and subsequently executes re-login. As a result, virtual path 2 can be newly identified by the path manager of the host H01. As shown in FIG. 12B, for example, the path manager is able to newly display the port ID "P02" for LUN0 on the management screen 1210.

The re-discovery request is a discovery request that is transmitted to the storage system 1 for a second or more time and re-discovery requests include the initial discovery request which is the discovery request transmitted to the storage system 1 for the first time. In FIG. 11B, because the ports that the host H01 is able to identify for the LUN0 are P00 and P01, the host H01 transmits a discovery request including LUN0 after closing the session in response to the session close request by designating port P00 or P01 (that is, at least one of the port IDs that the host H01 has currently identified). The controller 107' receives a discovery request containing a LUN0 via the port P00 or P01. If the controller 107' references the host table 123 and path table 124 in response to the discovery request, it is clear that the real paths 0 and 1 are assigned to the virtual paths 0 and 1 prepared for the host H01 and that a real path has not been assigned to the virtual path 2. Hence, the controller 107' selects one arbitrary port (P02, for example) from other ports (ports other than P00 and P01) that the controller 107' itself has and sends back a response containing the port IDs "P00", "P01" constituting the assigned real paths 0 and 1 respectively and the selected port ID "P02" to the host H01 as a discovery response to the discovery request including LUN0. Thereafter, the host H01 is able to establish a session between the respective ports P00, P01, and P02 (an iSCSI session, for example) by transmitting a login request to all the port IDs "P00", "P01", and "P02" contained in the response.

An overview of an example of the processing that is executed by the second embodiment was provided above. Further, in the second embodiment, at the time the host H01 is installed, there is not necessarily any need to prepare the virtual path 1 to which a real path has not been assigned for host H01. For example, only virtual path 0 need be prepared or virtual path 0 to which real path 1 has been assigned need be prepared. In other words, in the second embodiment, the backup resource may be either a virtual path that has not been designated once or a virtual path to which a real path has been assigned. Further, the port may be identified by an IP address in place of a port ID and an LU may be identified by an iSCSI name instead of a LUN.

FIG. 13 shows an example of the flow of host registration processing that is executed by a CPU according to the host registration program 115.

In the second embodiment, prior to host registration processing, the storage administrator is able to create an LU in the storage system 1 by manipulating the management terminal 2. On the other hand, a plurality of LU may already be prepared at the time the storage system 1 is shipped. In addition, in the second embodiment, the storage administrator is able to operate the management terminal 2 to transmit a host registration command that designates a host ID and LUN. The host registration processing may be started in response to the command. Alternatively, in the event of a combination with the first embodiment, for example, the criterion for the start of host registration processing may be the same as that of the first embodiment and may also be determined by means of the same method as that of step 5001 of FIG. 5.

In step 1301, the host registration program 115 determines the host ID. The host ID thus determined can be a host ID that is designated by a host registration command received from the management terminal 2. Alternatively, the host ID may also be determined by means of the same method as that of step 5001 in FIG. 5.

In step 1302, the host registration program 115 retrieves one or more unassigned real paths from the path table 124, selects an unassigned real path (real path 0, for example) from among the one or more retrieved unassigned real paths and changes the status corresponding to the selected real path to "assigned".

In step 1303, the host registration program 115 adds records in which the host ID "H01", an arbitrary virtual path ID (virtual path ID "0", for example), and the real path ID corresponding with the real path selected in step 1302 (real path ID "0", for example) are recorded to the host table 123.

In step 1304, the host registration program 115 adds records in which the host ID "H01", an arbitrary virtual path ID (virtual path ID "1", for example) and "unassigned" for the real path ID are recorded to the host table 121. In other words, the host registration program 111 prepares a virtual path to which a real path has not been assigned to the host H01.

An example of the host registration processing that is carried out by the host registration program 115 was described hereinabove. Further, for example, if the initial state of the host H01 may only be a virtual path 0 to which a real path has not been assigned, for example, steps 1302 and 1303 are not required and, in step 1304, a virtual path 0 to which a real path has not been assigned may be prepared. Further, for example, step 1304 need not necessarily be executed in the host registration processing (in this case, with the criterion that a virtual path that is prepared in step 1303 be first used, for example (that a command be first received via the virtual path), processing corresponding to step 1304 may be executed by a CPU according to another computer program). In addition, in step 1302, the host registration program 115 may select a real path estimated to have the lowest load on the basis of the load of the port 108 among unassigned real paths (the amount of traffic on the previous day and/or the number of assigned real paths among the real paths containing port 108, and so forth).

Figure 14:
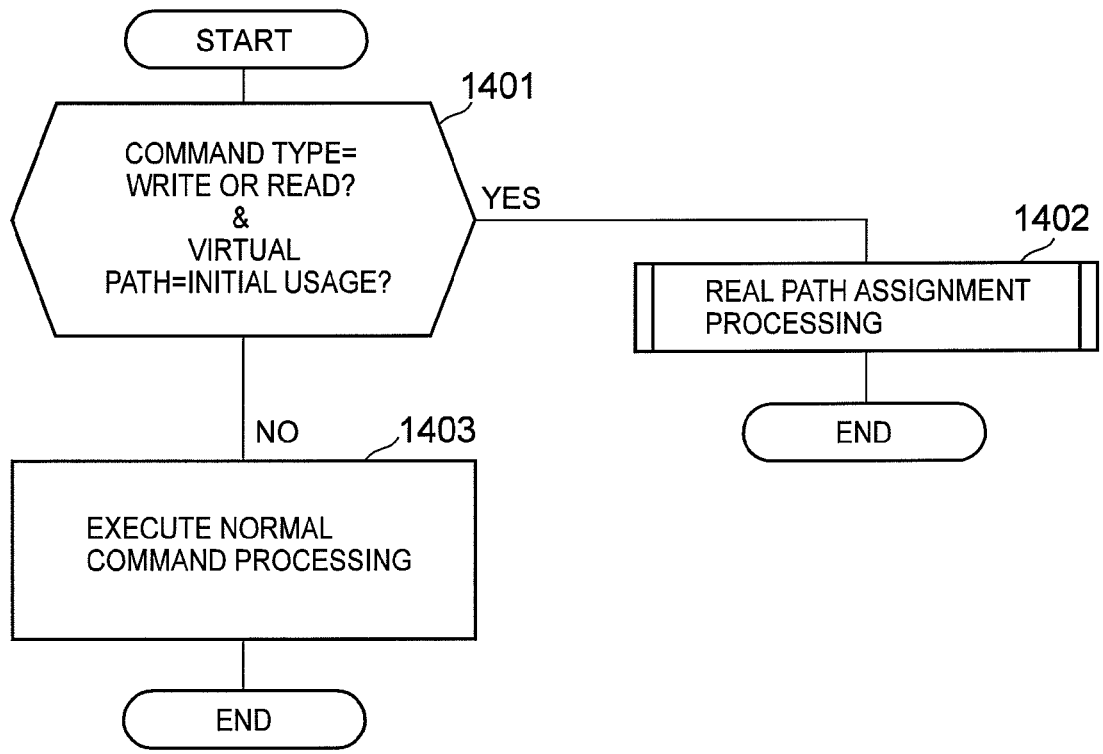
FIG. 14 shows an example of the flow of command control processing that is executed by a CPU according to the command control program of the second embodiment of the present invention.

FIG. 14 shows an example of the flow of command control processing that is executed by a CPU according to the command control program 116.

In step 1401, the command control program 116 judges whether the virtual path prepared for the host, which virtual path is used in the transmission of commands by the host, is the virtual path first used by the host ('initial usage virtual path' hereinbelow) and whether a received command is an I/O command (that is, a write command or a read command). If it is judged that the virtual path is an initial usage path and that the received command is an I/O command (Yes in step 1401), the command control program 116 executes real path assignment processing by calling up the virtual path control program 117 in step 1402. On the other hand, if it is judged that the virtual path is not the initial usage path or that the received command is not an I/O command (No in step 1401), the command control program 116 executes the received command processing (normal command processing) in step 1403.

Figure 15:
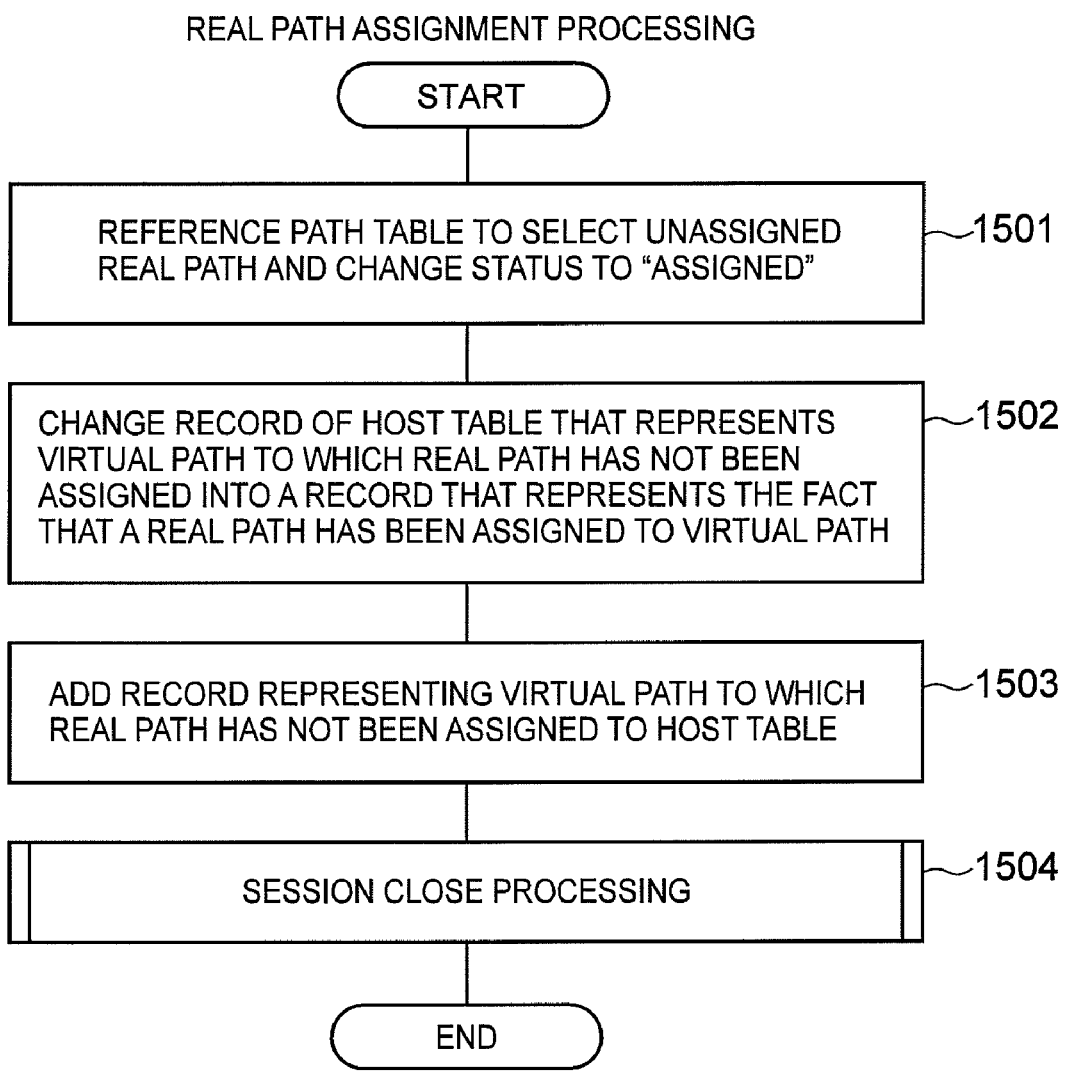
FIG. 15 shows an example of the flow of real path assignment processing that is executed by a CPU according to a virtual path control program of the second embodiment of the present invention.

FIG. 15 shows an example of the flow of real path assignment processing that is executed by a CPU according to the virtual path control program 117.

In step 1501, the virtual path control program 117 selects an unassigned real path from the path table 124 (that is, selects an "unassigned" real path ID) and changes the status of the selected real path to "assigned".

In step 1502, the virtual path control program 117 changes the record of the host table 123 that represents a virtual path to which a real path has not been assigned to a record representing the fact that a real path has been assigned to the virtual LU. More specifically, for example, the virtual path control program 117 changes "unassigned" in a record of the host table 122 that has the real path ID "unassigned" (a record in which the host ID of the transmission source host of the I/O command is recorded) to a real path ID with the status "assigned" in step 1501.

In step 1503, the virtual path control program 117 adds a record representing a virtual path to which a real path has not been assigned (a record in which the host ID of the transmission source host of the I/O command is recorded) to the host table 123.

In step 1504, the virtual path control program 117 calls up the session control program 114 (that is, session close processing is executed).

Real LU assignment processing that is executed by a CPU according to the virtual path control program 117 was described hereinabove. For example, in step 1501, among the unassigned real paths, the virtual path control program 117 may select a real path which is estimated to have the lowest load on the basis of the load of the port 108 (the amount of traffic on the previous day and/or the number of assigned real paths among the real paths containing the port 108, for example). For example, unassigned real paths include a first real path and a second real path and, in comparison with a port that corresponds with the port ID constituting the first real path, if the load of the port corresponding with the port ID constituting the second real path is low, the second real path may be selected.

The second embodiment was described hereinabove. In the second embodiment, at least one of a few modifications described in the first embodiment can be adopted. Furthermore, with respect to the time the host is installed, in cases where the method described with reference to FIG. 16 is adopted, for example, when the host H01 transmits a discovery request containing LUN0 to the storage system 1, the controller 107' of the storage system 1 may prepare a virtual path 0 for the host H01 and send back a port ID (for example, the port ID of the port receiving the discovery request or the port ID constituting a real path that is arbitrarily selected from among one or more unassigned real paths that have LUN0 as a constituent element) to the host H01. Furthermore, when a method described with reference to FIG. 17 is adopted, for example, the controller 107' of the storage system 1 receives a LUN0 path creation instruction from the management terminal 2 or host H01 or the like and, in response to the path creation instruction, may prepare virtual path 0 for the host H01 and send back a port ID (the port ID constituting the real path arbitrarily selected from among one or more unassigned real paths that have LUN0 as a constituent element) to the host H01. In addition, in cases where the method described with reference to FIG. 18 is adopted, for example, the controller 107' of the storage system 1 may prepare a virtual path 0 for the host H01 in response to receiving a change notification from the name management server and send back a port ID (the port ID constituting the real path arbitrarily selected from one or more unassigned real paths that have LUN0 as a constituent element) to the host H01.

According to the second embodiment, one or more virtual paths may always be prepared on a preliminary basis for the host. More specifically, for example, given that a virtual path to which a real path has not been assigned is first used, in other words, that an I/O command is first received via port 108 to which a real path has not been assigned, a real path is automatically assigned to the virtual path, the I/O command is processed, and a virtual path is newly prepared for the host. Further, the newly prepared virtual path can be used by allowing the host to execute a discovery request and re-login. As a result, it is possible to obviate the need to configure logical resource information for newly preparing a path for the host.

Although a few preferred embodiments of the present invention were described hereinabove, these embodiments are illustrations serving to explain the present invention, there being no intention to limit the scope of the present invention to these embodiments alone. The present invention can also be executed by a variety of other embodiments. For example, the management screens exemplified in FIGS. 4A, 4B, 12A, and 12B may be displayed on a display device with which the host is provided or may be displayed on a display screen of a host management terminal for managing the respective hosts. Moreover, the subject that displays the management screen can be a computer program that is executed by a host management terminal in place of a volume manager or path manager with which the host is provided.

What is claimed is:

1. A controller for controlling a plurality of logical resources of a storage system, comprising:
a virtual resource preparation section for preparing a virtual resource which is a virtual logical resource; and
a real resource assignment section that assigns a real resource which is a logical resource of a real entity to the prepared virtual resource; wherein
one or more backup resources which are virtual resources that have not yet been used by a higher-level section that is on a higher level than the controller are prepared by the virtual resource preparation section for one or more of the higher-level section;
wherein the virtual resource preparation section prepares one or more new back resource for the higher-level section given that the one or more backup resources prepared for the higher-level section are being used for the first time by the higher-level section.

2. The controller according to claim 1, wherein:
the one or more backup resources are the virtual resources to which one or more real resources have not been assigned;
the real resource assignment section selects a real resource that have not been assigned to any virtual resources from a plurality of real resources given that a backup resource are being used for the first time by the higher-level section and assigns the selected real resource to the backup resource used for the first time.

3. The controller according to claim 1, further comprising:
a close request section that issues a request to the higher-level section to close a connection with the higher-level section given that new backup resources have been prepared in the higher-level section.

4. The controller according to claim 1, wherein:
the virtual resource is a virtual storage device which is a virtual logical storage device;
the real resource is a real storage device which is a logical storage device of an entity which is formed based on one or more physical storage devices among a plurality of physical storage devices provided for the storage system;
the one or more backup resources are backup storage devices which are virtual logical storage devices that have not yet been designated by a write command that is transmitted by the higher-level section.

5. The controller according to claim 4, wherein the virtual resource preparation section prepares a new backup storage device for the higher-level section given that the virtual resource preparation section has received a write command designating a backup storage device from the higher-level section for the first time.

6. The controller according to claim 5, wherein:
the backup storage device is a virtual storage device to which a real storage device has not been assigned;
given that a write command designating a backup storage device is received from the higher-level section for the first time, the real resource assignment section selects a real storage device that has not been assigned to any virtual storage device from among a plurality of real storage devices and assigns the selected real storage device to the backup storage device.

7. The controller according to claim 4, further comprising:
a command control section that writes data according to a received write command to the real storage device that has been assigned to the backup storage device designated by the write command; and
a close request section that transmits a close request which is a request to close a connection with the higher-level section to the higher-level section given that a new backup storage device has been prepared for the higher-level section;
wherein the command control section, when the higher-level section and the controller is connected after the connection has been closed in response to the close request, provides the higher-level section with information relating to the new backup storage device prepared for the higher-level section in response to a command of a predetermined type received from the higher-level section.

8. The controller according to claim 4, further comprising:
a storage region for storing policy information defining at least one of: (1) how many virtual storage devices, and (2) which capacities of virtual storage devices, are prepared for the higher-level section of a particular type wherein the virtual resource preparation section controls at least one of: (1) the number, and (2);
wherein the virtual resource preparation section controls the number and/or capacity of the backup storage devices stored for the higher-level section on the basis of the type of higher-level section of the transmission source of the write command and the policy information.

9. The controller according to claim 1, further comprising:
a command control section; and
a close request section
wherein:
the virtual resource is a virtual logical unit (LU);
the real resource is a real LU which is a LU of an entity which is formed based on one or more physical storage devices among a plurality of physical storage devices provided for the storage system;
the one or more backup resource are backup LUs which are virtual LUs that have not yet been designated the real LU;
the virtual resource preparation section prepares a backup LU for the higher-level section for the first time given that predetermined type event is occurred, after that, prepares a new backup LU for the higher-level section given that a write command designating the backup LU is received from the higher-level section for the first time;
given that the write command designating the backup LU is received from the higher-level section for the first time, the real resource assignment section selects a real LU that has not been assigned to any virtual LU from among a plurality of real LUs and assigns the selected real LU to the backup LU;
the close request section that issues a request to the higher-level section to close a connection with the higher-level section given that the new backup LU have been prepared in the higher-level section;
the command control section for writing data according to a received write command to the real LU that has been assigned to the backup LU designated by the write command, after the connection has been closed in response to the close request, provides the higher-level section with information relating to the new backup LU prepared for the higher-level section in response to a re-login from the higher-level section.

10. The controller according to claim 1, wherein:
the virtual resource is a virtual path which is virtual logical path;
the real resource is a real path which is a logical path for an entity;
the one or more backup resource are backup paths which are virtual paths which have not yet been used in a transmission of an I/O command transmitted by the higher-level section.

11. The controller according to claim 10, wherein the virtual resource preparation section prepares a new backup path for the higher-level section given that an I/O command that has passed via the backup path is received for the first time from the higher-level section.

12. The controller according to claim 11, wherein:
the backup path is a virtual path to which a real path has not been assigned;
the real resource assignment section selects a real path that has not been assigned to any virtual path from among a plurality of real paths given that an I/O command that has passed via the backup path is received for the first time from the higher-level section and assigns the selected real path to the backup path.

13. The controller according to claim 10, further comprising:
a command control section for processing a received I/O command;
a close request section that transmits a close request which is a request to close a connection with the higher-level section to the higher-level section given that a new backup path has been prepared for the higher-level section;
wherein the command control section, when the higher-level section and controller is connected after the connection has been closed in response to the close request, provides the higher-level section with information relating to a new backup path that is prepared for the higher-level section in response to a command of a predetermined type received from the higher-level section.

14. The controller according to claim 10 further comprising a plurality of ports that receive commands transmitted from each of the one or more higher-level sections;
wherein:
the logical path contains a port ID;
in response to the load of the respective ports corresponding with the port IDs of two of more real paths that have not been assigned to any virtual paths, the real resource assignment section controls a real path selected from among the two or more real paths.

15. The controller according to claim 1, further comprising:
a command control section;
a close request section; and
a plurality of ports;
wherein:
the virtual resource is a virtual path which is virtual logical path;
the real resource is a real path which is a logical path for an entity;
the one or more backup resources are backup paths which are virtual paths which have not yet been used in a transmission of an I/O command transmitted by the higher-level section;
the logical path contains a port ID;
the virtual resource preparation section prepares a backup path for the higher-level section for the first time given that predetermined type event is occurred, after that, prepares a new backup path for the higher-level section given that an I/O command that has passed via the backup path is received for the first time from the higher-level section;
the real resource assignment section selects a real path that has not been assigned to any virtual path from among a plurality of real paths given that an I/O command that has passed via the backup path is received for the first time from the higher-level section and assigns the selected real path to the backup path;
the command control section, when the higher-level section and controller is connected after a connection has been closed in response to a close request, provides the higher-level section with port ID relating to a new backup path in response to a discovery command received from the higher-level section, and connects a port corresponding with the port ID and the higher-level section.

16. The controller according to claim 1, wherein:
the virtual resource is a virtual storage device which is a virtual logical storage device or a virtual path which is a virtual logical path;
the real resource is a real storages device which is a logical storage device of an entity which is formed based on one or more physical storage devices among a plurality of physical storage devices provided for the storage system, or a the real resource is a real path which is a logical path for an entity;
the one or more backup resources are backup storage devices which are virtual logical storage devices that have not yet been designated by a write command that is transmitted by the higher-level section, or backup paths which are virtual paths which have not yet been used in a transmission of an I/O command transmitted by the higher-level section.

17. A storage system including a controller that configured to control a plurality of logical resources of the storage system, the storage system comprising:
a virtual resource preparation section for preparing a virtual resource which is a virtual logical resource; and
a real resource assignment section that assigns a real resource which is a logical resource of a real entity to the prepared virtual resource; wherein one or more backup resources, which are virtual resources that have not yet been used by a higher-level section that is on a higher level than the controller are prepared by the virtual resource preparation section for one or more of the higher-level section;
wherein the virtual resource preparation section prepares one or more new backup resources for the higher-level section given that the one or more backup resources prepared for the higher-level section are being used for the first time by the higher-level section.

18. A method for controlling a plurality of logical resources of a storage system, including use of a controller, the method comprising:

preparing a virtual resource which is a virtual logical resource so as to one or more backup resources which are virtual resources that have not yet been used by a higher-level section that is on a higher level than the controller are prepared for the higher-level section; and
assigning a real resource which is a logical resource of a real entity to the prepared virtual resource;

wherein the preparing of the virtual resource includes preparing one or more new backup resources or the higher-level section given that the one or more backup resources prepared for the higher-level section are being used for the first time by the higher-level section.

* * * * *